(12) United States Patent
Yoshida et al.

(10) Patent No.: US 12,487,389 B2
(45) Date of Patent: Dec. 2, 2025

(54) CIRCULARLY POLARIZING PLATE AND DISPLAY DEVICE

(71) Applicant: FUJIFILM Corporation, Tokyo (JP)

(72) Inventors: Shinpei Yoshida, Kanagawa (JP); Yuta Takahashi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 547 days.

(21) Appl. No.: 17/952,991

(22) Filed: Sep. 26, 2022

(65) Prior Publication Data

US 2023/0113900 A1   Apr. 13, 2023

(30) Foreign Application Priority Data

Sep. 29, 2021   (JP) .................. 2021-159477

(51) Int. Cl.
*G02B 5/30*   (2006.01)

(52) U.S. Cl.
CPC .................. *G02B 5/3016* (2013.01)

(58) Field of Classification Search
CPC .... G02B 5/3016; G02B 5/3041; G02B 5/305; G02B 5/3083
See application file for complete search history.

(56) References Cited

U.S. PATENT DOCUMENTS

| | | | | |
|---|---|---|---|---|
| 6,261,649 B1 * | 7/2001 | Takagi | ................ | G02B 5/3016 428/1.3 |
| 6,977,700 B2 * | 12/2005 | Uesaka | ............ | G02F 1/133528 349/98 |
| 7,307,679 B2 * | 12/2007 | Toyooka | ............... | G02B 5/3083 349/123 |
| 9,122,091 B2 * | 9/2015 | Saitoh | .................. | G02B 5/3016 |
| 9,128,322 B2 * | 9/2015 | Saitoh | ............... | G02F 1/133528 |
| 9,366,793 B2 * | 6/2016 | Saitoh | ................ | H10K 59/8791 |
| 2006/0066804 A1 * | 3/2006 | Tasaka | ................ | G02B 5/3016 349/179 |
| 2016/0011352 A1 | 1/2016 | Saitoh et al. | | |

FOREIGN PATENT DOCUMENTS

JP   5966079 B2   8/2016

* cited by examiner

*Primary Examiner* — Nicholas R. Pasko
(74) *Attorney, Agent, or Firm* — Edwards Neils LLC; Jean C. Edwards, Esq.

(57) ABSTRACT

Provided are a circularly polarizing plate in which the black tint variation is suppressed in a case where a display device obtained by attaching the circularly polarizing plate to a display element is displayed in black and is then viewed from the front direction in a sunlight environment, and a display device. The circularly polarizing plate is has a polarizer, a first optically anisotropic layer, and a second optically anisotropic layer in this order, in which the first optically anisotropic layer is a layer formed by fixing a liquid crystal compound twist-aligned along a helical axis extending in a thickness direction, the second optically anisotropic layer is an A-plate, an absorption axis of the polarizer and an in-plane slow axis of the second optically anisotropic layer are parallel or orthogonal to each other, and the first optically anisotropic layer and the second optically anisotropic layer exhibit predetermined optical properties.

7 Claims, 6 Drawing Sheets

CIRCULARLY POLARIZING PLATE AND DISPLAY DEVICE

CROSS-REFERENCE TO RELATED APPLICATIONS

The present application claims priority under 35 U.S.C. § 119 to Japanese Patent Application No. 2021-159477, filed on Sep. 29, 2021. The above application is hereby expressly incorporated by reference, in its entirety, into the present application.

BACKGROUND OF THE INVENTION

1. Field of the Invention

The present invention relates to a circularly polarizing plate and a display device.

2. Description of the Related Art

A circularly polarizing plate including a phase difference film having a refractive index anisotropy is applied to various applications such as an image display apparatus. More specifically, a circularly polarizing plate is used in an organic EL display device, an LCD display device, or the like in order to suppress adverse effects due to external light reflection.

For example, JP5966079B discloses a circularly polarizing plate having a polarizing film, a first optically anisotropic layer exhibiting predetermined optical properties, and a second optically anisotropic layer exhibiting predetermined optical properties in this order and shows that, in a display device including the circularly polarizing plate, a tint in which another color is mixed with black (black tint variation) in a case of being viewed from the front direction is suppressed.

SUMMARY OF THE INVENTION

On the other hand, in a case where a display device including the circularly polarizing plate described in JP5966079B is displayed in black and the characteristics thereof are evaluated under more severe conditions such as in a sunlight environment, the present inventors confirmed that black tint variation is observed in a case of being viewed from the front direction, and therefore there is room for improvement.

The present invention has been made in view of the above circumstances, and an object of the present invention is to provide a circularly polarizing plate in which the black tint variation is suppressed in a case where a display device obtained by attaching the circularly polarizing plate to a display element is displayed in black and is then viewed from the front direction in a sunlight environment.

Another object of the present invention is to provide a display device.

As a result of extensive studies on the problems of the related art, the present inventors have found that the foregoing objects can be achieved by the following configurations.

(1) A circularly polarizing plate having a polarizer, a first optically anisotropic layer, and a second optically anisotropic layer in this order, in which the first optically anisotropic layer is a layer formed by fixing a liquid crystal compound twist-aligned along a helical axis extending in a thickness direction, the second optically anisotropic layer is an A-plate, an absorption axis of the polarizer and an in-plane slow axis of the second optically anisotropic layer are parallel or orthogonal to each other, a value of a product $\Delta nd$ of a refractive index anisotropy $\Delta n$ of the first optically anisotropic layer at a wavelength of 550 rim and a thickness d of the first optically anisotropic layer satisfies a relationship of Expression (1) which will be described later, an in-plane retardation Re(550) of the second optically anisotropic layer at a wavelength of 550 nm satisfies a relationship of Expression (2) which will be described later, in a case of observing the circularly polarizing plate from a polarizer side, and expressing a counterclockwise direction as a positive angle value with the absorption axis of the polarizer as 90°, an angle of an in-plane slow axis on a surface of the first optically anisotropic layer on the polarizer side is defined as X, and in a case of observing the circularly polarizing plate from the polarizer side, and expressing the counterclockwise direction as the positive angle value and a clockwise direction as a negative angle value, with reference to the in-plane slow axis on the surface of the first optically anisotropic layer on the polarizer side, a twisted angle of a liquid crystal compound in the first optically anisotropic layer is defined as Y, in a case where the absorption axis of the polarizer and the in-plane slow axis of the second optically anisotropic layer are parallel to each other, X and Y satisfy any of requirements 1 to 4 which will be described later, and in a case where the absorption axis of the polarizer and the in-plane slow axis of the second optically anisotropic layer are orthogonal to each other, X and Y satisfy a requirement 5 or 6 which will be described later.

(2) The circularly polarizing plate according to (1), in which the value of the product $\Delta nd$ of the refractive index anisotropy $\Delta n$ of the first optically anisotropic layer at a wavelength of 550 nm and the thickness d of the first optically anisotropic layer satisfies a relationship of Expression (1-1) which will be described later, the in-plane retardation Re(550) of the second optically anisotropic layer at a wavelength of 550 nm satisfies a relationship of Expression (2-1) which will be described later, in a case where the absorption axis of the polarizer and the in-plane slow axis of the second optically anisotropic layer are parallel to each other, X and Y satisfy any of requirements 1-1 to 4-1 which will be described later, and in a case where the absorption axis of the polarizer and the in-plane slow axis of the second optically anisotropic layer are orthogonal to each other, X and Y satisfy a requirement 5-1 or 6-1 which will be described later.

(3) The circularly polarizing plate according to (1) or (2), in which the second optically anisotropic layer is a stretched film or a layer formed by fixing a liquid crystal compound.

(4) A display device including the circularly polarizing plate according to any one of (1) to (3).

According to an aspect of the present invention, it is possible to provide a circularly polarizing plate in which the black tint variation is suppressed in a case where a display device obtained by attaching the circularly polarizing plate to a display element is displayed in black and is then viewed from the front direction in a sunlight environment.

According to another aspect of the present invention, it is also possible to provide a display device.

DESCRIPTION OF THE PREFERRED EMBODIMENTS

Figure 1:
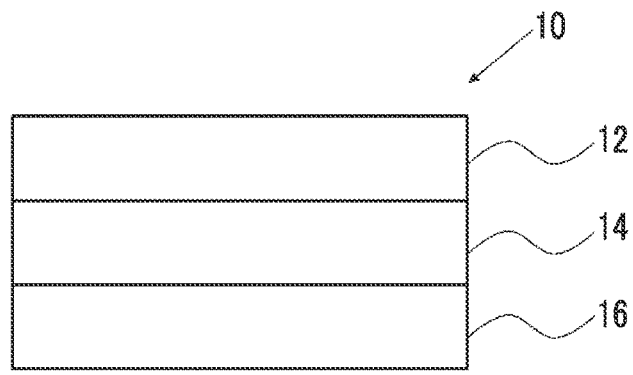
FIG. 1 is an example of a schematic cross-sectional view of a circularly polarizing plate of the present invention.

Hereinafter, the present invention will be described in more detail.

Any numerical range expressed using "to" in the present specification refers to a range including the numerical values before and after the "to" as a lower limit value and an upper limit value, respectively.

In addition, the in-plane slow axis and the in-plane fast axis are defined at a wavelength of 550 nm unless otherwise specified. That is, unless otherwise specified, for example, the in-plane slow axis direction means a direction of the in-plane slow axis at a wavelength of 550 nm.

In the present invention, $Re(\lambda)$ and $Rth(\lambda)$ represent an in-plane retardation and a thickness direction retardation at a wavelength $\lambda$, respectively. Unless otherwise specified, the wavelength $\lambda$ is 550 nm.

In the present invention, $Re(\lambda)$ and $Rth(\lambda)$ are values measured at a wavelength $\lambda$ in AxoScan OPMF-1 (manufactured by Opto Science, Inc.). By inputting an average refractive index $((nx+ny+nz)/3)$ and a film thickness (d (μm)) in AxoScan, slow axis direction (°)

$$Re(\lambda)=R0(\lambda)$$

$$Rth(\lambda)=((nx+ny)/2-nz)\times d$$

are calculated.

Although $R0(\lambda)$ is displayed as a numerical value calculated by AxoScan OPMF-1, it means $Re(\lambda)$.

In the present specification, the refractive indexes nx, ny, and nz are measured using an Abbe refractometer (NAR-4T, manufactured by Atago Co., Ltd.) and using a sodium lamp ($\lambda$=589 nm) as a light source. In addition, in a case of measuring the wavelength dependence, it can be measured with a multi-wavelength Abbe refractometer DR-M2 (manufactured by Atago Co., Ltd.) in combination with an interference filter.

In addition, the values in Polymer Handbook (John Wiley & Sons, Inc.) and catalogs of various optical films can be used. The values of the average refractive index of main optical films are illustrated below: cellulose acylate (1.48), cycloolefin polymer (1.52), polycarbonate (1.59), polymethylmethacrylate (1.49), and polystyrene (1.59).

In the present specification, the A-plate is defined as follows.

There are two types of A-plates, a positive A-plate (A-plate which is positive) and a negative A-plate (A-plate which is negative). The positive A-plate satisfies the relationship of Expression (A1) and the negative A-plate satisfies the relationship of Expression (A2) in a case where a refractive index in a film in-plane slow axis direction (in a direction in which an in-plane refractive index is maximum) is defined as nx, a refractive index in an in-plane direction orthogonal to the in-plane slow axis is defined as ny, and a refractive index in a thickness direction is defined as nz. In addition, the positive A-plate has an Rth showing a positive value and the negative A-plate has an Rth showing a negative value.

$$nx > ny \approx nz \qquad \text{Expression (A1)}$$

$$ny < nx \approx nz \qquad \text{Expression (A2)}$$

It should be noted that the symbol "≈" encompasses not only a case where the both sides are completely the same as each other but also a case where the both sides are substantially the same as each other. The expression "substantially the same" means that, for example, a case where (ny−nz)×d (in which d is a thickness of a film) is −10 to 10 nm and preferably −5 to 5 nm is also included in "ny≈nz"; and a case where (nx−nz)×d is −10 to 10 nm and preferably −5 to 5 nm is also included in "nx: nz".

In the present specification, the "visible ray" is intended to refer to light having a wavelength of 400 to 700 nm. In addition, the "ultraviolet ray" is intended to refer to light having a wavelength of 10 nm or more and less than 400 nm.

In addition, in the present specification, the "orthogonal" or "parallel" is intended to include a range of errors acceptable in the art to which the present invention pertains. For example, it means that an angle is in an error range of ±5° with respect to the exact angle, and the error with respect to the exact angle is preferably in a range of ±3°.

A feature point of the circularly polarizing plate according to the embodiment of the present invention is that predetermined optically anisotropic layers are used in combination.

Hereinafter, the circularly polarizing plate according to the embodiment of the present invention will be described with reference to the accompanying drawings. FIG. 1 shows a schematic cross-sectional view of the circularly polarizing plate according to the embodiment of the present invention.

A circularly polarizing plate 10 has a polarizer 12, a first optically anisotropic layer 14, and a second optically anisotropic layer 16 in this order.

The first optically anisotropic layer 14 is a layer formed by fixing a liquid crystal compound twist-aligned along a helical axis extending in a thickness direction, and the second optically anisotropic layer 16 is an A-plate.

Hereinafter, each layer will be described in detail.

Polarizer

The polarizer may be a member having a function of converting natural light into specific linearly polarized light, and examples thereof include an absorption type polarizer.

The type of the polarizer is not particularly limited, and a commonly used polarizer can be used. Examples of the polarizer include an iodine-based polarizer, a dye-based polarizer using a dichroic substance, and a polyene-based polarizer. The iodine-based polarizer and the dye-based polarizer are generally prepared by adsorbing iodine or a dichroic dye on a polyvinyl alcohol, followed by stretching.

A protective film may be disposed on one side or both sides of the polarizer.

First Optically Anisotropic Layer

The first optically anisotropic layer 14 is a layer formed by fixing a liquid crystal compound twist-aligned along a helical axis extending in a thickness direction.

In a case of forming the first optically anisotropic layer 14, it is preferable to use at least a liquid crystal compound and a chiral agent which will be described later.

In the present specification, the "fixed" state is a state in which the alignment of a liquid crystal compound is maintained. Specifically, the "fixed" state is preferably a state in which, in a temperature range of usually 0° C. to 50° C. or in a temperature range of −30° C. to 70° C. under more severe conditions, the layer has no fluidity and a fixed alignment morphology can be maintained stably without causing a change in the alignment morphology due to an external field or an external force.

Since the twisted angle of the liquid crystal compound (twisted angle in the alignment direction of the liquid crystal compound) changes depending on the relationship between the in-plane slow axis of the second optically anisotropic layer 16 and the absorption axis of the polarizer, the details thereof will be described later.

The twisted angle is measured using an AxoScan (polarimeter) device manufactured by Axometrics, Inc. and using device analysis software of Axometrics, Inc.

In addition, the "the liquid crystal compound is twist-aligned" is intended to mean that the liquid crystal compound from one main surface to the other main surface of the first optically anisotropic layer 14 is twisted about the thickness direction of the first optically anisotropic layer 14. Along with this, the alignment direction (in-plane slow axis direction) of the liquid crystal compound differs depending on the position of the first optically anisotropic layer 14 in a thickness direction.

In a case where the liquid crystal compound is a rod-like liquid crystal compound, it is preferable that the major axis of the rod-like liquid crystal compound is disposed so as to be parallel to the main surface of the first optically anisotropic layer 14, in the twisted alignment. It is not required to be strictly parallel, and the angle formed by the major axis of the rod-like liquid crystal compound and the main surface of the first optically anisotropic layer 14 is preferably in a range of 0°±20° and more preferably in a range of 0°±10°.

The value of a product Δnd of a refractive index anisotropy Δn of the first optically anisotropic layer 14 at a wavelength of 550 nm and a thickness d of the first optically anisotropic layer 14 satisfies a relationship of Expression (1). That is, Δnd is in a range of 317 to 377 inn.

$$317 \text{ nm} \leq \Delta nd \leq 377 \text{ nm} \qquad \text{Expression (1)}$$

Above all, it is preferable to satisfy the relationship of Expression (1-1) from the viewpoint that the black tint variation is further suppressed (hereinafter, also referred to simply as "the viewpoint that the effect of the present invention is more excellent") in a case where a display device obtained by attaching a circularly polarizing plate to a display element is displayed in black and is then viewed from the front direction in a sunlight environment.

$$327 \text{ nm} \leq \Delta nd \leq 367 \text{ nm} \qquad \text{Expression (1-1)}$$

The Δnd is measured using an AxoScan (polarimeter) device manufactured by Axometrics, Inc. and using device analysis software of Axometrics, Inc.

The type of the liquid crystal compound used for forming the first optically anisotropic layer 14 is not particularly limited, and examples thereof include known compounds.

Examples of the liquid crystal compound include a rod-like liquid crystal compound and a disk-like liquid crystal compound, among which a rod-like liquid crystal compound is preferable.

Examples of the rod-like liquid crystal compound include compounds described in claim 1 of JP1999-513019A (JP-H11-513019A) and paragraphs [0026] to [0098] of JP2005-289980A.

Examples of the disk-like liquid crystal compound include the compounds described in paragraphs [0020] to [0067] of JP2007-108732A and paragraphs [0013] to [0108] of JP2010-244038A.

The liquid crystal compound may have a polymerizable group.

The types of polymerizable groups that the liquid crystal compound may have are as described above.

The first optically anisotropic layer 14 is preferably a layer formed by fixing a liquid crystal compound having a polymerizable group by polymerization. More specifically, the first optically anisotropic layer 14 is more preferably a layer formed by fixing a liquid crystal compound (preferably a rod-like liquid crystal compound) twist-aligned and having a polymerizable group by polymerization.

The thickness of the first optically anisotropic layer 14 is not particularly limited, and is preferably 10 μm or less, more preferably 0.1 to 5.0 μm, and still more preferably 0.3 to 2.0 μm.

The thickness of the first optically anisotropic layer 14 is intended to refer to an average thickness of the first optically anisotropic layer 14. The average thickness is obtained by measuring the thicknesses of any five or more points of the first optically anisotropic layer 14 and arithmetically averaging the measured values.

Second Optically Anisotropic Layer

The second optically anisotropic layer 16 is an A-plate. Examples of the A-plate include a negative A-plate and a positive A-plate.

In the in-plane retardation of the second optically anisotropic layer 16 at a wavelength of 550 nm, Re(550) satisfies the relationship of Expression (2).

$$67.5 \text{ nm} \leq Re(550) \leq 127.5 \text{ nm} \quad \text{Expression (2)}$$

Above all, it is preferable to satisfy the relationship of Expression (2-1) from the viewpoint that the effect of the present invention is more excellent.

$$77.5 \text{ nm} \leq Re(550) \leq 117.5 \text{ nm} \quad \text{Expression (2-1)}$$

The second optically anisotropic layer 16 may exhibit forward wavelength dispersibility (characteristic that the in-plane retardation decreases as the measurement wavelength increases) or reverse wavelength dispersibility (characteristic that the in-plane retardation increases as the measurement wavelength increases). The forward wavelength dispersibility and the reverse wavelength dispersibility are preferably exhibited in a visible light range.

The second optically anisotropic layer 16 may be a positive A-plate or a negative A-plate. Examples of the second optically anisotropic layer 16 include a layer formed by fixing a liquid crystal compound and a stretched film.

The layer formed by fixing a liquid crystal compound is preferably a layer formed by fixing a homogeneously aligned rod-like liquid crystal compound.

The homogeneous alignment in the present specification refers to a state in which a molecular axis of a liquid crystal compound (for example, a major axis in a case of a rod-like liquid crystal compound) is disposed horizontally and in the same direction with respect to the layer surface (optical uniaxiality).

Here, "horizontal" does not require that the molecular axis of the liquid crystal compound is strictly horizontal with respect to the layer surface, but is intended to mean an alignment in which the tilt angle formed by the average molecular axis of the liquid crystal compound and the main surface of the layer is less than 20°.

In addition, the same direction does not require that the molecular axis of the liquid crystal compound is disposed strictly in the same direction with respect to the layer surface, but is intended to mean that, in a case where the direction of the slow axis is measured at any 20 positions in the plane, the maximum difference between the slow axis directions among the slow axis directions at 20 positions (the difference between the two slow axis directions having a maximum difference among the 20 slow axis directions) is less than 10°.

Examples of the liquid crystal compound include the liquid crystal compounds exemplified in the first optically anisotropic layer 14.

The liquid crystal compound may have a polymerizable group.

The types of polymerizable groups that the liquid crystal compound may have are as described above.

The second optically anisotropic layer 16 is preferably a layer formed by fixing a liquid crystal compound having a polymerizable group by polymerization, and more preferably a layer formed by fixing a liquid crystal compound aligned homogeneously and having a polymerizable group by polymerization.

The thickness of the second optically anisotropic layer 16 is not particularly limited, and is preferably 10 μm or less, more preferably 0.1 to 5.0 μm, and still more preferably 0.3 to 2.0 μm.

The thickness of the second optically anisotropic layer 16 is intended to refer to an average thickness of the second optically anisotropic layer 16. The average thickness is obtained by measuring the thicknesses of any five or more points of the second optically anisotropic layer 16 and arithmetically averaging the measured values.

Other Members

The circularly polarizing plate 10 may include members other than the above-mentioned polarizer 12, first optically anisotropic layer 14, and second optically anisotropic layer 16.

Adhesion Layer

The circularly polarizing plate 10 may have an adhesion layer between individual optically anisotropic layers.

Examples of the adhesion layer include known pressure sensitive adhesive layers and adhesive layers.

As described in JP1999-149015A (JP-H11-149015A), it is generally preferable to adjust the refractive index of each layer (for example, an optically anisotropic layer) from the viewpoint of suppressing reflection. The difference in refractive index from that of an adhesion target is preferably 0.1 or less, more preferably 0.08 or less, still more preferably 0.06 or less, and particularly preferably 0.03 or less.

In a case where the adhesion layer is disposed between the layers of the optically anisotropic layers formed by fixing a liquid crystal compound, a high-refractive adhesive or pressure sensitive adhesive may be used.

In order to increase the refractive index, it is also preferable to use a high-refractive monomer or a high-refractive metal fine particle.

The high-refractive monomer preferably has a benzene ring skeleton in a molecule thereof. Examples of the monofunctional monomer having a benzene ring skeleton in a molecule thereof include ethoxylated o-phenylphenol (meth)acrylate, o-phenylphenol glycidyl ether (meth)acrylate, para-cumylphenoxyethylene glycol (meth)acrylate, 2-methacryloyloxyethyl phthalate, 2-acryloyloxyethyl phthalate, 2-acryloyloxyethyl-2-hydroxyethyl phthalate, 2-acryloyloxypropyl phthalate, phenoxyethyl (meth)acrylate, EO-modified phenol (meth)acrylate, phenoxydiethylene glycol (meth)acrylate, EO-modified nonylphenol (meth) acrylate, PO-modified nonylphenol (meth)acrylate, phenyl glycidyl ether (meth)acrylate, neopentyl glycol benzoate (meth)acrylate, nonylphenoxypolyethylene glycol (meth)

acrylate, ECH-modified phenoxy (meth)acrylate, benzyl (meth)acrylate, and vinyl carbazole.

Examples of the high-refractive metal fine particle include an inorganic particle. Examples of the component constituting the inorganic particle include a metal oxide, a metal nitride, a metal oxynitride, and a simple substance of metal. Examples of the metal atom contained in the metal oxide, the metal nitride, the metal oxynitride, and the simple substance of metal include a titanium atom, a silicon atom, an aluminum atom, a cobalt atom, and a zirconium atom. Specific examples of the inorganic particle include inorganic oxide particles such as an alumina particle, an alumina hydrate particle, a silica particle, a zirconia particle, and a clay mineral (for example, smectite). A zirconium oxide particle is preferable from the viewpoint [[in terms of refractive index.

The refractive index can be adjusted to a predetermined value by changing the amount of inorganic particles.

The average particle diameter of the inorganic particle is not particularly limited. In a case where zirconium oxide is used as a main component, the average particle diameter of the inorganic particle is preferably 1 to 120 nm, more preferably 1 to 60 nm, and still more preferably 2 to 40 nm.

Alignment Film

The circularly polarizing plate 10 may further have an alignment film. The alignment film may be disposed between individual optically anisotropic layers.

As shown in FIG. 1, it is preferable that the circularly polarizing plate 10 does not have an alignment film between individual optically anisotropic layers.

The alignment film can be formed by means such as rubbing treatment of an organic compound (preferably a polymer), oblique vapor deposition of an inorganic compound, formation of a layer having microgrooves, or accumulation of an organic compound (for example, w-tricosanoic acid, dioctadecylmethylammonium chloride, or methyl stearate) by the Langmuir-Blodgett method (LB film).

Further, there is also known an alignment film capable of expressing an alignment function by application of an electric field, application of a magnetic field, or light (preferably polarized light) irradiation.

The alignment film is preferably formed by a rubbing treatment of a polymer.

Examples of the alignment film include a photo-alignment film.

The thickness of the alignment film is not particularly limited as long as it can exhibit an alignment function, and is preferably 0.01 to 5.0 µm, more preferably 0.05 to 2.0 µm, and still more preferably 0.1 to 0.5 µm.

Substrate

The circularly polarizing plate 10 may further have a substrate.

The substrate is preferably a transparent substrate. The transparent substrate is intended to refer to a substrate having a visible light transmittance of 60% or more, which preferably has a visible light transmittance of 80% or more and more preferably 90% or more. The thickness of the substrate is not particularly limited, and is preferably 10 to 200 µm, more preferably 10 to 100 µm, and still more preferably 20 to 90 µm.

In addition, the substrate may consist of a plurality of layers laminated. In order to improve the adhesion of the substrate to the layer provided thereon, the surface of the substrate may be subjected to a surface treatment (for example, a glow discharge treatment, a corona discharge treatment, an ultraviolet (UV) treatment, or a flame treatment).

In addition, an adhesive layer (undercoat layer) may be provided on the substrate.

The substrate may be a so-called temporary support. For example, after producing an optically anisotropic layer on a substrate, the substrate may be peeled off from the optically anisotropic layer, if necessary.

Positional Relationship Between Absorption Axis of Polarizer and in-Plane Slow Axis of Optically Anisotropic Layer The positional relationship between the absorption axis of the polarizer and the in-plane slow axis of the optically anisotropic layer in the circularly polarizing plate according to the embodiment of the present invention will be described below.

In the circularly polarizing plate according to the embodiment of the present invention, the absorption axis of the polarizer and the in-plane slow axis of the second optically anisotropic layer are parallel or orthogonal to each other.

First, in a case of observing the circularly polarizing plate from the polarizer side, and expressing a counterclockwise direction as a positive angle value with the absorption axis of the polarizer as 90°, the angle of the in-plane slow axis on the surface of the first optically anisotropic layer on the polarizer side is defined as X; and in a case of observing the circularly polarizing plate from the polarizer side, and expressing a counterclockwise direction as a positive angle value and a clockwise direction as a negative angle value, with reference to the in-plane slow axis on the surface of the first optically anisotropic layer on the polarizer side, the twisted angle of the liquid crystal compound in the first optically anisotropic layer is defined as Y, and X and Y satisfy any of requirements 1 to 4 in a case where the absorption axis of the polarizer and the in-plane slow axis of the second optically anisotropic layer are parallel to each other.

| | |
|---|---|
| $0° \leq X < 20°$ and $-X+20° \leq Y \leq -X+60°$ | Requirement 1: |
| $0° \leq X \leq 20°$ and $-X-60° \leq Y \leq -X-20$ | Requirement 2: |
| $160° \leq X \leq 180°$ and $-X+200° \leq Y \leq -X+240°$ | Requirement 3: |
| $160° < X \leq 180°$ and $-X+120° \leq Y \leq -X+160°$ | Requirement 4: |

In addition, any of requirements 1-1 to 4-1 is satisfied from the viewpoint that the effect of the present invention is more excellent.

| | |
|---|---|
| $0° \leq X < 20°$ and $-X+30° \leq Y \leq -X+50°$ | Requirement 1-1: |
| $0° \leq X \leq 20°$ and $-X-50° \leq Y \leq -X-30°$ | Requirement 2-1: |
| $160° \leq X \leq 180°$ and $-X+210° \leq Y \leq -X+230°$ | Requirement 3-1: |
| $160° < X \leq 180°$ and $-X+130° \leq Y \leq -X+150°$ | Requirement 4-1: |

Hereinafter, the requirements 1 to 4 will be described.

Requirement 1

The requirement 1 satisfies the relationship between the following two expressions.

| | |
|---|---|
| $0° \leq X < 20°$ | Expression (A-1) |
| $-X+20° \leq Y \leq -X+60°$ | Expression (A-2) |

That is, it means that X is in a range of 0° or more and less than 20°, and Y is in a range of $-X+20°$ to $-X+60°$.

Hereinafter, an embodiment of a circularly polarizing plate satisfying the requirement 1 will be described with reference to the accompanying drawings.

Figure 2:
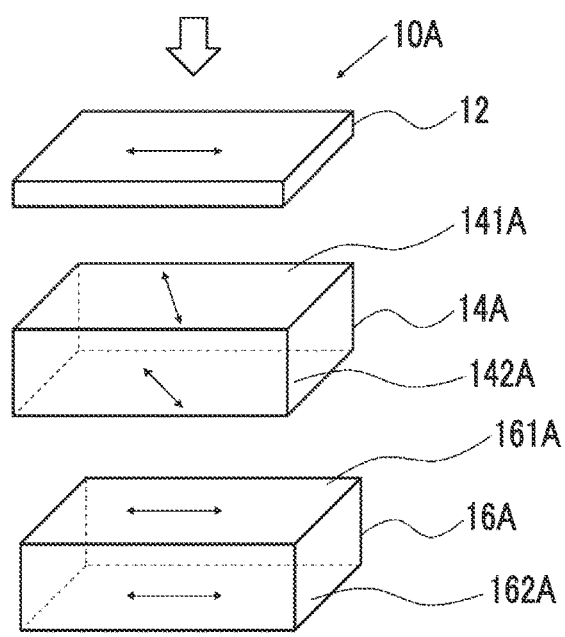
FIG. 2 is a view showing a relationship between an absorption axis of a polarizer and an in-plane slow axis of each of a first optically anisotropic layer and a second optically anisotropic layer in one embodiment satisfying a requirement 1 of the circularly polarizing plate of the present invention.

FIG. 2 is a view showing a relationship between an absorption axis of a polarizer 12 and an in-plane slow axis of each of a first optically anisotropic layer 14A and a second optically anisotropic layer 16A in a circularly polarizing plate 10A. In FIG. 2, the arrow in the polarizer 12 indicates an absorption axis, and the arrow in the first optically anisotropic layer 14A and the second optically anisotropic layer 16A indicates an in-plane slow axis in each layer.

Figure 3:
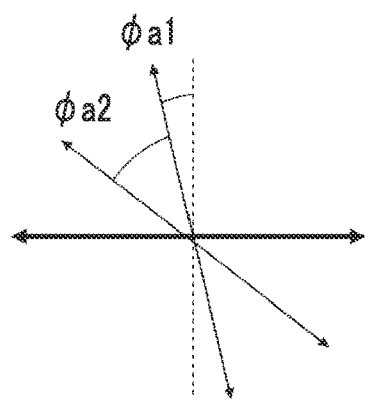
FIG. 3 is a schematic view showing a relationship of an angle between the absorption axis of the polarizer and the in-plane slow axis of each of the first optically anisotropic layer and the second optically anisotropic layer, upon observation from the direction of a white arrow in FIG. 2.

In addition, FIG. 3 is a view showing a relationship of the angle between the absorption axis (thick line) of the polarizer 12 and the in-plane slow axis (solid line) of each of the first optically anisotropic layer 14A and the second optically anisotropic layer 16A, upon observation from the white arrow in FIG. 2.

The angle of the in-plane slow axis represents counterclockwise as a positive angle value with the absorption axis of the polarizer 12 as 90°, upon observation from the white arrow in FIG. 2. In addition, the twisted angle of the liquid crystal compound is represented by a positive angle value in a counterclockwise direction and a negative angle value in a clockwise direction by determining whether the liquid crystal compound is right-hand twisted (clockwise) or left-hand twisted (counterclockwise) with reference to the in-plane slow axis on a surface 141A of the front side (the polarizer 12 side) in the first optically anisotropic layer 14A, upon observation from the white arrow in FIG. 2.

As shown in FIG. 2, the circularly polarizing plate 10A includes the polarizer 12, the first optically anisotropic layer 14A, and the second optically anisotropic layer 16A in this order.

As shown in FIG. 2 and FIG. 3, in a case where the absorption axis of the polarizer 12 is defined as 90°, the in-plane slow axis on the surface 141A of the first optically anisotropic layer 14A on the polarizer 12 side is 10°. More specifically, the in-plane slow axis on the surface 141A of the first optically anisotropic layer 14A on the polarizer 12 side is rotated by 10° (counterclockwise 10°) with respect to the direction (broken line in FIG. 3) orthogonal to the absorption axis of the polarizer 12. That is, an angle <φa1 formed by the direction orthogonal to the absorption axis of the polarizer 12 and the in-plane slow axis on the surface 141A of the first optically anisotropic layer 14A on the polarizer 12 side is 10°.

FIG. 2 and FIG. 3 show an aspect in which the in-plane slow axis on the surface 141A of the first optically anisotropic layer 14A is located at a position of 10°, but the present invention is not limited to this aspect. It is sufficient that the relationship of Expression (A-1) is satisfied. Specifically, it is sufficient that X is in a range of 0° or more and less than 20°.

As described above, the first optically anisotropic layer 14A is a layer formed by fixing a liquid crystal compound twist-aligned along a helical axis extending in a thickness direction. Therefore, the in-plane slow axis on the surface 141A of the first optically anisotropic layer 14A on the polarizer 12 side and the in-plane slow axis on a surface 142A of the first optically anisotropic layer 14A opposite to the polarizer 12 side forms a predetermined twisted angle. Specifically, as shown in FIG. 2 and FIG. 3, an angle φa2 formed by the in-plane slow axis on the surface 141A of the first optically anisotropic layer 14A on the polarizer 12 side and the in-plane slow axis on the surface 142A of the first optically anisotropic layer 14A opposite to the polarizer 12 side is 30°. More specifically, the twisted direction of the liquid crystal compound in the first optically anisotropic layer 14A is a left-handed twist (counterclockwise), and the twisted angle thereof is 30°.

FIG. 2 and FIG. 3 show an aspect in which the twisted direction of the liquid crystal compound in the first optically anisotropic layer 14A is a left-handed twist (counterclockwise), and the twisted angle thereof is 30°, but the present invention is not limited to this aspect. It is sufficient that the relationship of Expression (A-2) is satisfied. Specifically, it is sufficient that Y is in a range of $-X+20°$ to $-X+60°$. More specifically, in a case where X is 10° as described above, Y may be in a range of 10° to 50°.

As shown in FIG. 2 and FIG. 3, the absorption axis of the polarizer 12 and the in-plane slow axis on a surface 161A of the second optically anisotropic layer 16A on the polarizer 12 side are parallel to each other.

The second optically anisotropic layer 16A is an A-plate, and the in-plane slow axis on the surface 161A of the second optically anisotropic layer 16A on the polarizer 12 side and the in-plane slow axis on a surface 162A of the second optically anisotropic layer 16A opposite to the polarizer 12 side are parallel to each other.

Requirement 2

The requirement 2 satisfies the relationship between the following two expressions.

$$0° \le X \le 20°\qquad\text{Expression (B-1)}$$

$$-X-60° \le Y \le -X-20°\qquad\text{Expression (B-2)}$$

That is, it means that X is in a range of 0° to 20° and Y is in a range of $-X-60°$ to $-X-20°$.

Hereinafter, an embodiment of a circularly polarizing plate satisfying the requirement 2 will be described with reference to the accompanying drawings.

Figure 4:
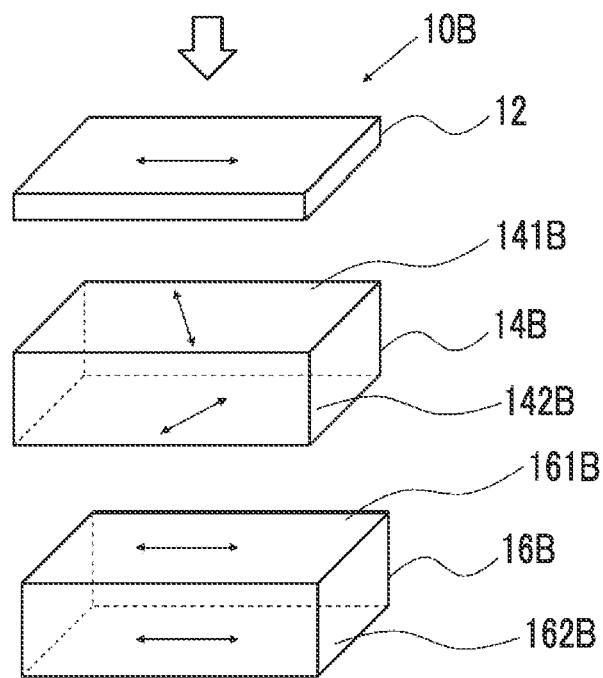
FIG. 4 is a view showing a relationship between the absorption axis of the polarizer and the in-plane slow axis of each of the first optically anisotropic layer and the second optically anisotropic layer in one embodiment satisfying a requirement 2 of the circularly polarizing plate of the present invention.

FIG. 4 is a view showing a relationship between an absorption axis of a polarizer 12 and an in-plane slow axis of each of a first optically anisotropic layer 14B and a second optically anisotropic layer 16B in a circularly polarizing plate 10B. In FIG. 4, the arrow in the polarizer 12 indicates an absorption axis, and the arrow in the first optically anisotropic layer 14B and the second optically anisotropic layer 16B indicates an in-plane slow axis in each layer.

Figure 5:
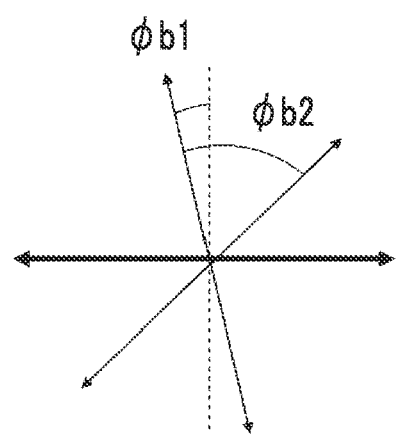
FIG. 5 is a schematic view showing a relationship of an angle between the absorption axis of the polarizer and the in-plane slow axis of each of the first optically anisotropic layer and the second optically anisotropic layer, upon observation from the direction of a white arrow in FIG. 4.

In addition, FIG. 5 is a view showing a relationship of the angle between the absorption axis (thick line) of the polarizer 12 and the in-plane slow axis (solid line) of each of the first optically anisotropic layer 14B and the second optically anisotropic layer 16B, upon observation from the white arrow in FIG. 4.

The angle of the in-plane slow axis represents counterclockwise as a positive angle value with the absorption axis of the polarizer 12 as 90°, upon observation from the white arrow in FIG. 4. In addition, the twisted angle of the liquid crystal compound is represented by a positive angle value in a counterclockwise direction and a negative angle value in a clockwise direction by determining whether the liquid crystal compound is right-hand twisted (clockwise) or left-hand twisted (counterclockwise) with reference to the in-plane slow axis on a surface 141B of the front side (the polarizer 12 side) in the first optically anisotropic layer 14B, upon observation from the white arrow in FIG. 4.

As shown in FIG. 4, the circularly polarizing plate 10B includes the polarizer 12, the first optically anisotropic layer 14B, and the second optically anisotropic layer 16B in this order.

As shown in FIG. 4 and FIG. 5, in a case where the absorption axis of the polarizer 12 is defined as 90°, the in-plane slow axis on the surface 141B of the first optically anisotropic layer 14B on the polarizer 12 side is 10°. More specifically, the in-plane slow axis on the surface 141B of the first optically anisotropic layer 14B on the polarizer 12 side is rotated by 10° (counterclockwise 10°) with respect to the direction (broken line in FIG. 5) orthogonal to the absorption axis of the polarizer 12. That is, an angle φb1 formed by the direction orthogonal to the absorption axis of the polarizer 12 and the in-plane slow axis on the surface 141B of the first optically anisotropic layer 14B on the polarizer 12 side is 10°.

FIG. 4 and FIG. 5 show an aspect in which the in-plane slow axis on the surface 141B of the first optically anisotropic layer 14B is located at a position of 10°, but the present invention is not limited to this aspect. It is sufficient that the relationship of Expression (B-1) is satisfied. Specifically, it is sufficient that X is in a range of 0° to 20°.

As described above, the first optically anisotropic layer 14B is a layer formed by fixing a liquid crystal compound twist-aligned along a helical axis extending in a thickness direction. Therefore, the in-plane slow axis on the surface 141B of the first optically anisotropic layer 14B on the polarizer 12 side and the in-plane slow axis on a surface 142B of the first optically anisotropic layer 14B opposite to the polarizer 12 side forms a predetermined twisted angle. Specifically, as shown in FIG. 4 and FIG. 5, an angle φb2 formed by the in-plane slow axis on the surface 141B of the first optically anisotropic layer 14B on the polarizer 12 side and the in-plane slow axis on the surface 142B of the first optically anisotropic layer 14B opposite to the polarizer 12 side is 50°. More specifically, the twisted direction of the liquid crystal compound in the first optically anisotropic layer 14B is a right-handed twist (clockwise), and the twisted angle thereof is −50°.

FIG. 4 and FIG. 5 show an aspect in which the twisted direction of the liquid crystal compound in the first optically anisotropic layer 14B is a right-handed twist (clockwise), and the twisted angle thereof is −50°, but the present invention is not limited to this aspect. It is sufficient that the relationship of Expression (B-2) is satisfied. Specifically, it is sufficient that Y is in a range of −X−60° to −X−20°. More specifically, in a case where X is 10° as described above, Y may be in a range of −70° to −30°.

As shown in FIG. 4 and FIG. 5, the absorption axis of the polarizer 12 and the in-plane slow axis on a surface 161B of the second optically anisotropic layer 16B on the polarizer 12 side are parallel to each other.

The second optically anisotropic layer 16B is an A-plate, and the in-plane slow axis on the surface 161B of the second optically anisotropic layer 16B on the polarizer 12 side and the in-plane slow axis on a surface 162B of the second optically anisotropic layer 16B opposite to the polarizer 12 side are parallel to each other.

Requirement 3

The requirement 3 satisfies the relationship between the following two expressions.

$$160° \leq X \leq 180° \quad \text{Expression (C-1)}$$

$$-X+200° \leq Y \leq -X+240° \quad \text{Expression (C-2)}$$

That is, it means that X is in a range of 160° to 180° and Y is in a range of −X+200° to −X+240°.

Hereinafter, an embodiment of a circularly polarizing plate satisfying the requirement 3 will be described with reference to the accompanying drawings.

Figure 6:
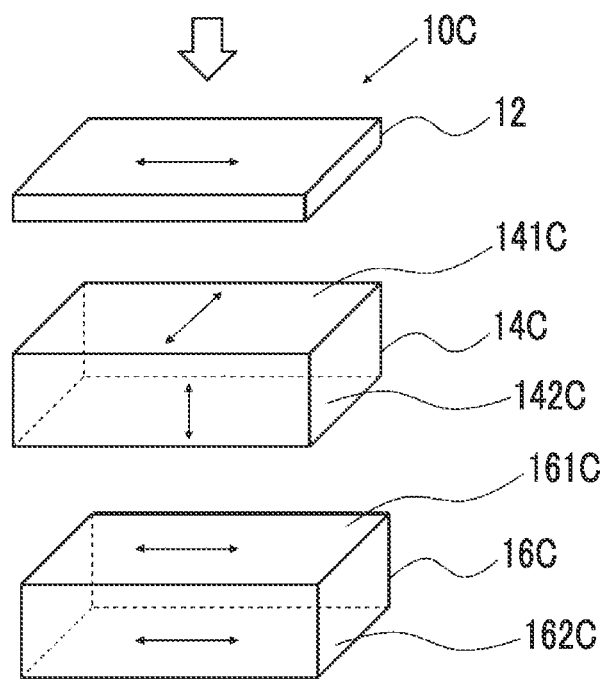
FIG. 6 is a view showing a relationship between the absorption axis of the polarizer and the in-plane slow axis of each of the first optically anisotropic layer and the second optically anisotropic layer in one embodiment satisfying a requirement 3 of the circularly polarizing plate of the present invention.

FIG. 6 is a view showing a relationship between an absorption axis of a polarizer 12 and an in-plane slow axis of each of a first optically anisotropic layer 14C and a second optically anisotropic layer 16C in a circularly polarizing plate 10C. In FIG. 6, the arrow in the polarizer 12 indicates an absorption axis, and the arrow in the first optically anisotropic layer 14C and the second optically anisotropic layer 16C indicates an in-plane slow axis in each layer.

Figure 7:
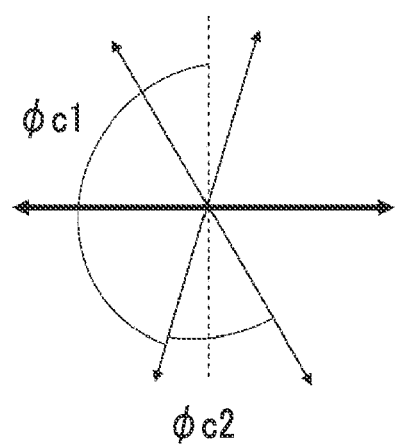
FIG. 7 is a schematic view showing a relationship of an angle between the absorption axis of the polarizer and the in-plane slow axis of each of the first optically anisotropic layer and the second optically anisotropic layer, upon observation from the direction of a white arrow in FIG. 6.

In addition, FIG. 7 is a view showing a relationship of the angle between the absorption axis (thick line) of the polarizer 12 and the in-plane slow axis (solid line) of each of the first optically anisotropic layer 14C and the second optically anisotropic layer 16C, upon observation from the white arrow in FIG. 6.

The angle of the in-plane slow axis represents counterclockwise as a positive angle value with the absorption axis of the polarizer 12 as 90°, upon observation from the white arrow in FIG. 6. In addition, the twisted angle of the liquid crystal compound is represented by a positive angle value in a counterclockwise direction and a negative angle value in a clockwise direction by determining whether the liquid crystal compound is right-hand twisted (clockwise) or left-hand twisted (counterclockwise) with reference to the in-plane slow axis on a surface 141C of the front side (the polarizer 12 side) in the first optically anisotropic layer 14C, upon observation from the white arrow in FIG. 6.

As shown in FIG. 6, the circularly polarizing plate 10C includes the polarizer 12, the first optically anisotropic layer 14C, and the second optically anisotropic layer 16C in this order.

As shown in FIG. 6 and FIG. 7, in a case where the absorption axis of the polarizer 12 is defined as 90°, the in-plane slow axis on the surface 141C of the first optically anisotropic layer 14C on the polarizer 12 side is 170°. More specifically, the in-plane slow axis on the surface 141C of the first optically anisotropic layer 14C on the polarizer 12 side is rotated by 170° (counterclockwise 170°) with respect to the direction (broken line in FIG. 7) orthogonal to the absorption axis of the polarizer 12. That is, an angle c formed by the direction orthogonal to the absorption axis of the polarizer 12 and the in-plane slow axis on the surface 141C of the first optically anisotropic layer 14C on the polarizer 12 side is 170°.

FIG. 6 and FIG. 7 show an aspect in which the in-plane slow axis on the surface 141C of the first optically anisotropic layer 14C is located at a position of 170°, but the present invention is not limited to this aspect. It is sufficient that the relationship of Expression (C-1) is satisfied. Specifically, it is sufficient that X is in a range of 160° to 180°.

As described above, the first optically anisotropic layer 14C is a layer formed by fixing a liquid crystal compound twist-aligned along a helical axis extending in a thickness direction. Therefore, the in-plane slow axis on the surface 141C of the first optically anisotropic layer 14C on the polarizer 12 side and the in-plane slow axis on a surface 142C of the first optically anisotropic layer 14C opposite to the polarizer 12 side forms a predetermined twisted angle. Specifically, as shown in FIG. 6 and FIG. 7, an angle φc2 formed by the in-plane slow axis on the surface 141C of the first optically anisotropic layer 14C on the polarizer 12 side and the in-plane slow axis on the surface 142C of the first optically anisotropic layer 14C opposite to the polarizer 12 side is 50°. More specifically, the twisted direction of the liquid crystal compound in the first optically anisotropic layer 14C is a left-handed twist (counterclockwise), and the twisted angle thereof is 50°.

FIG. 6 and FIG. 7 show an aspect in which the twisted direction of the liquid crystal compound in the first optically anisotropic layer 14C is a left-handed twist (counterclockwise), and the twisted angle thereof is 50°, but the present invention is not limited to this aspect. It is sufficient that the relationship of Expression (C-2) is satisfied. Specifically, it is sufficient that Y is in a range of −X+200° to −X+240°.

More specifically, in a case where X is 170° as described above, Y may be in a range of 30° to 70°.

As shown in FIG. 6 and FIG. 7, the absorption axis of the polarizer 12 and the in-plane slow axis on a surface 161C of the second optically anisotropic layer 16C on the polarizer 12 side are parallel to each other.

The second optically anisotropic layer 16C is an A-plate, and the in-plane slow axis on the surface 161C of the second optically anisotropic layer 16C on the polarizer 12 side and the in-plane slow axis on a surface 162C of the second optically anisotropic layer 16C opposite to the polarizer 12 side are parallel to each other.

Requirement 4

The requirement 4 satisfies the relationship between the following two expressions.

$$160°<X≤180°\qquad\text{Expression (D-1)}$$

$$-X+120°≤Y≤-X+160°\qquad\text{Expression (D-2)}$$

That is, it means that X is in a range of more than 160° and 1800 or less, and Y is in a range of $-X+120°$ to $-X+160°$.

Hereinafter, an embodiment of a circularly polarizing plate satisfying the requirement 4 will be described with reference to the accompanying drawings.

Figure 8:
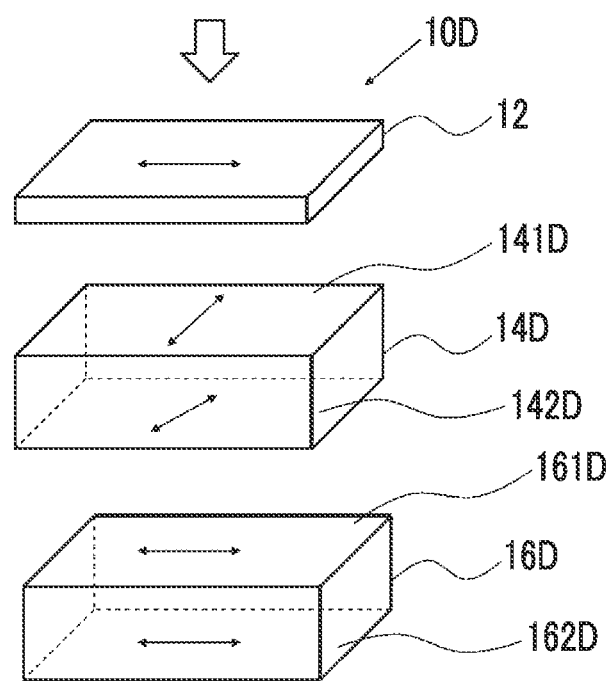
FIG. 8 is a view showing a relationship between the absorption axis of the polarizer and the in-plane slow axis of each of the first optically anisotropic layer and the second optically anisotropic layer in one embodiment satisfying a requirement 4 of the circularly polarizing plate of the present invention.

FIG. 8 is a view showing a relationship between an absorption axis of a polarizer 12 and an in-plane slow axis of each of a first optically anisotropic layer 14D and a second optically anisotropic layer 16D in a circularly polarizing plate 10D. In FIG. 8, the arrow in the polarizer 12 indicates an absorption axis, and the arrow in the first optically anisotropic layer 14D and the second optically anisotropic layer 16D indicates an in-plane slow axis in each layer.

Figure 9:
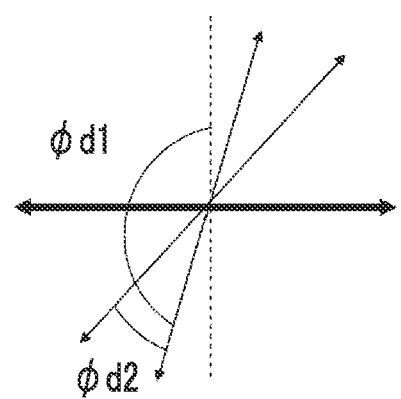
FIG. 9 is a schematic view showing a relationship of an angle between the absorption axis of the polarizer and the in-plane slow axis of each of the first optically anisotropic layer and the second optically anisotropic layer, upon observation from the direction of a white arrow in FIG. 8.

In addition, FIG. 9 is a view showing a relationship of the angle between the absorption axis (thick line) of the polarizer 12 and the in-plane slow axis (solid line) of each of the first optically anisotropic layer 14D and the second optically anisotropic layer 16D, upon observation from the white arrow in FIG. 8.

The angle of the in-plane slow axis represents counter-clockwise as a positive angle value with the absorption axis of the polarizer 12 as 90°, upon observation from the white arrow in FIG. 8. In addition, the twisted angle of the liquid crystal compound is represented by a positive angle value in a counterclockwise direction and a negative angle value in a clockwise direction by determining whether the liquid crystal compound is right-hand twisted (clockwise) or left-hand twisted (counterclockwise) with reference to the in-plane slow axis on a surface 141D of the front side (the polarizer 12 side) in the first optically anisotropic layer 14D, upon observation from the white arrow in FIG. 8.

As shown in FIG. 8, the circularly polarizing plate 10D includes the polarizer 12, the first optically anisotropic layer 14D, and the second optically anisotropic layer 16D in this order.

As shown in FIG. 8 and FIG. 9, in a case where the absorption axis of the polarizer 12 is defined as 90°, the in-plane slow axis on the surface 141D of the first optically anisotropic layer 14D on the polarizer 12 side is 170°. More specifically, the in-plane slow axis on the surface 141D of the first optically anisotropic layer 14D on the polarizer 12 side is rotated by 170° (counterclockwise 170°) with respect to the direction (broken line in FIG. 9) orthogonal to the absorption axis of the polarizer 12. That is, an angle φd1 formed by the direction orthogonal to the absorption axis of the polarizer 12 and the in-plane slow axis on the surface 141D of the first optically anisotropic layer 14D on the polarizer 12 side is 170°.

FIG. 8 and FIG. 9 show an aspect in which the in-plane slow axis on the surface 141D of the first optically anisotropic layer 14D is located at a position of 170°, but the present invention is not limited to this aspect. It is sufficient that the relationship of Expression (D-1) is satisfied. Specifically, it is sufficient that X is in a range of more than 160° and 180° or less.

As described above, the first optically anisotropic layer 14D is a layer formed by fixing a liquid crystal compound twist-aligned along a helical axis extending in a thickness direction. Therefore, the in-plane slow axis on the surface 141D of the first optically anisotropic layer 14D on the polarizer 12 side and the in-plane slow axis on a surface 142D of the first optically anisotropic layer 14D opposite to the polarizer 12 side forms a predetermined twisted angle. Specifically, as shown in FIG. 8 and FIG. 9, an angle φd2 formed by the in-plane slow axis on the surface 141D of the first optically anisotropic layer 14D on the polarizer 12 side and the in-plane slow axis on the surface 142D of the first optically anisotropic layer 14D opposite to the polarizer 12 side is 30°. More specifically, the twisted direction of the liquid crystal compound in the first optically anisotropic layer 14D is a right-handed twist (clockwise), and the twisted angle thereof is −30°.

FIG. 8 and FIG. 9 show an aspect in which the twisted direction of the liquid crystal compound in the first optically anisotropic layer 14D is a right-handed twist (clockwise), and the twisted angle thereof is −30°, but the present invention is not limited to this aspect. It is sufficient that the relationship of Expression (D-2) is satisfied. Specifically, it is sufficient that Y is in a range of $-X+1200$ to $-X+160°$. More specifically, in a case where X is 170° as described above, Y may be in a range of −50 to −10°.

As shown in FIG. 8 and FIG. 9, the absorption axis of the polarizer 12 and the in-plane slow axis on the surface 161D of the second optically anisotropic layer 16D on the polarizer 12 side are parallel to each other.

The second optically anisotropic layer 16D is an A-plate, and the in-plane slow axis on the surface 161D of the second optically anisotropic layer 16D on the polarizer 12 side and the in-plane slow axis on a surface 162D of the second optically anisotropic layer 16D opposite to the polarizer 12 side are parallel to each other.

In addition, in a case where the absorption axis of the polarizer and the in-plane slow axis of the second optically anisotropic layer are orthogonal to each other, X and Y satisfy a requirement 5 or 6.

$$70°≤X<110°\text{ and }-X+110°≤Y≤-X+150°\qquad\text{Requirement 5:}$$

$$70°<X≤110°\text{ and }-X+30°≤Y≤-X+70°\qquad\text{Requirement 6:}$$

Above all, it is more preferable to satisfy a requirement 5-1 or 6-1 from the viewpoint that the effect of the present invention is more excellent.

$$70°≤X<110°\text{ and }-X+120°≤Y≤-X+140°\qquad\text{Requirement 5-1:}$$

$$70°<X≤110°\text{ and }-X+40°≤Y≤-X+60°\qquad\text{Requirement 6-1:}$$

Hereinafter, the requirements 5 and 6 will be described.

Requirement 5

The requirement 5 satisfies the relationship between the following two expressions.

$$70° \leq X < 110° \quad \text{Expression (E-1)}$$

$$-X+110° \leq Y \leq -X+150° \quad \text{Expression (E-2)}$$

That is, it means that X is in a range of 70° or more and less than 110°, and Y is in a range of −X+110° to −X+150°.

Hereinafter, an embodiment of a circularly polarizing plate satisfying the requirement 5 will be described with reference to the accompanying drawings.

Figure 10:
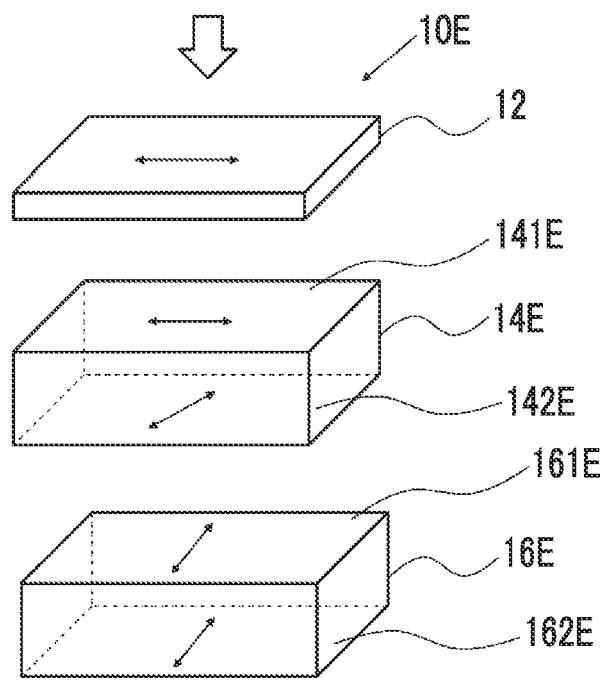
FIG. 10 is a view showing a relationship between the absorption axis of the polarizer and the in-plane slow axis of each of the first optically anisotropic layer and the second optically anisotropic layer in one embodiment satisfying a requirement 5 of the circularly polarizing plate of the present invention.

FIG. 10 is a view showing a relationship between an absorption axis of a polarizer 12 and an in-plane slow axis of each of a first optically anisotropic layer 14E and a second optically anisotropic layer 16E in a circularly polarizing plate 10E. In FIG. 10, the arrow in the polarizer 12 indicates an absorption axis, and the arrow in the first optically anisotropic layer 14E and the second optically anisotropic layer 16E indicates an in-plane slow axis in each layer.

Figure 11:
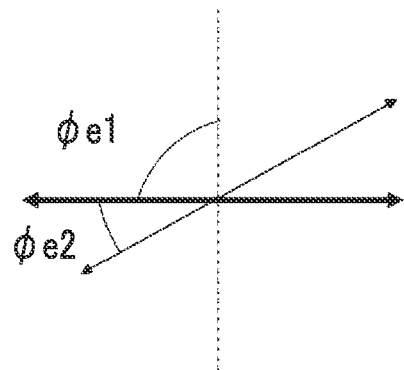
FIG. 11 is a schematic view showing a relationship of an angle between the absorption axis of the polarizer and the in-plane slow axis of each of the first optically anisotropic layer and the second optically anisotropic layer, upon observation from the direction of a white arrow in FIG. 10.

In addition, FIG. 11 is a view showing a relationship of the angle between the absorption axis (thick line) of the polarizer 12 and the in-plane slow axis (solid line) of each of the first optically anisotropic layer 14E and the second optically anisotropic layer 16E, upon observation from the white arrow in FIG. 10.

The angle of the in-plane slow axis represents counterclockwise as a positive angle value with the absorption axis of the polarizer 12 as 90°, upon observation from the white arrow in FIG. 10. In addition, the twisted angle of the liquid crystal compound is represented by a positive angle value in a counterclockwise direction and a negative angle value in a clockwise direction by determining whether the liquid crystal compound is right-hand twisted (clockwise) or left-hand twisted (counterclockwise) with reference to the in-plane slow axis on a surface 141E of the front side (the polarizer 12 side) in the first optically anisotropic layer 14E, upon observation from the white arrow in FIG. 10.

As shown in FIG. 10, the circularly polarizing plate 10E includes the polarizer 12, the first optically anisotropic layer 14E, and the second optically anisotropic layer 16E in this order.

As shown in FIG. 10 and FIG. 11, in a case where the absorption axis of the polarizer 12 is defined as 90°, the in-plane slow axis on the surface 141E of the first optically anisotropic layer 14E on the polarizer 12 side is 90°. More specifically, the in-plane slow axis on the surface 141E of the first optically anisotropic layer 14E on the polarizer 12 side is rotated by 90° (counterclockwise 90°) with respect to the direction (broken line in FIG. 11) orthogonal to the absorption axis of the polarizer 12. That is, an angle φe1 formed by the direction orthogonal to the absorption axis of the polarizer 12 and the in-plane slow axis on the surface 141E of the first optically anisotropic layer 14E on the polarizer 12 side is 90°.

FIG. 10 and FIG. 11 show an aspect in which the in-plane slow axis on the surface 141E of the first optically anisotropic layer 14E is located at a position of 90° but the present invention is not limited to this aspect. It is sufficient that the relationship of Expression (E-1) is satisfied. Specifically, it is sufficient that X is in a range of 70° or more and less than 110°.

As described above, the first optically anisotropic layer 14E is a layer formed by fixing a liquid crystal compound twist-aligned along a helical axis extending in a thickness direction. Therefore, the in-plane slow axis on the surface 141E of the first optically anisotropic layer 14E on the polarizer 12 side and the in-plane slow axis on a surface 142E of the first optically anisotropic layer 14E opposite to the polarizer 12 side forms a predetermined twisted angle. Specifically, as shown in FIG. 10 and FIG. 11, an angle φe2 formed by the in-plane slow axis on the surface 141E of the first optically anisotropic layer 14E on the polarizer 12 side and the in-plane slow axis on the surface 142E of the first optically anisotropic layer 14E opposite to the polarizer 12 side is 40°. More specifically, the twisted direction of the liquid crystal compound in the first optically anisotropic layer 14E is a left-handed twist (counterclockwise), and the twisted angle thereof is 40°.

FIG. 10 and FIG. 11 show an aspect in which the twisted direction of the liquid crystal compound in the first optically anisotropic layer 14E is a left-handed twist (counterclockwise), and the twisted angle thereof is 40°, but the present invention is not limited to this aspect. It is sufficient that the relationship of Expression (E-2) is satisfied. Specifically, it is sufficient that Y is in a range of −X+110° to −X+150°. More specifically, in a case where X is 90° as described above, Y may be in a range of 20° to 60°.

As shown in FIG. 10 and FIG. 11, the absorption axis of the polarizer 12 and the in-plane slow axis on the surface 161E of the second optically anisotropic layer 16E on the polarizer 12 side are orthogonal to each other.

The second optically anisotropic layer 16E is an A-plate, and the in-plane slow axis on the surface 161E of the second optically anisotropic layer 16E on the polarizer 12 side and the in-plane slow axis on a surface 162E of the second optically anisotropic layer 16E opposite to the polarizer 12 side are parallel to each other.

Requirement 6 The requirement 6 satisfies the relationship between the following two expressions.

$$70° < X \leq 110° \quad \text{Expression (F-1)}$$

$$-X+30° \leq Y \leq -X+70° \quad \text{Expression (F-2)}$$

That is, it means that X is in a range of more than 70° and 110° or less, and Y is in a range of −X+30° to −X+70°.

Hereinafter, an embodiment of a circularly polarizing plate satisfying the requirement 6 will be described with reference to the accompanying drawings.

Figure 12:
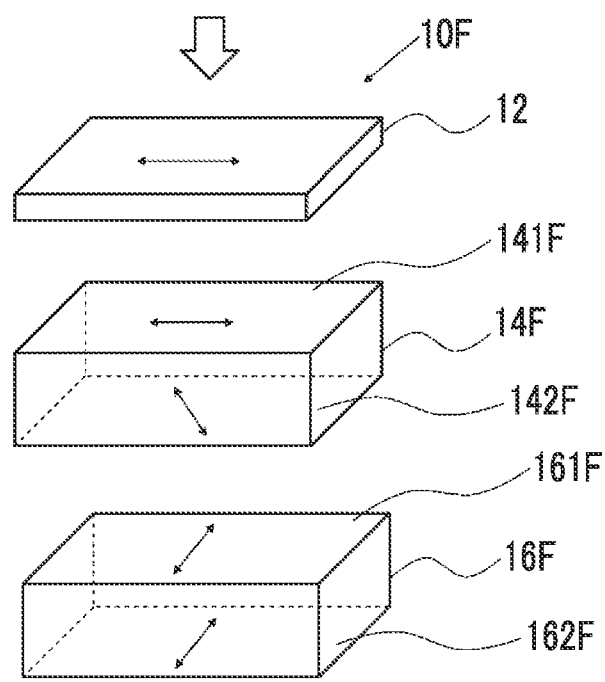
FIG. 12 is a view showing a relationship between the absorption axis of the polarizer and the in-plane slow axis of each of the first optically anisotropic layer and the second optically anisotropic layer in one embodiment satisfying a requirement 6 of the circularly polarizing plate of the present invention.

FIG. 12 is a view showing a relationship between an absorption axis of a polarizer 12 and an in-plane slow axis of each of a first optically anisotropic layer 14F and a second optically anisotropic layer 16F in a circularly polarizing plate 0F. In FIG. 12, the arrow in the polarizer 12 indicates an absorption axis, and the arrow in the first optically anisotropic layer 14F and the second optically anisotropic layer 16F indicates an in-plane slow axis in each layer.

Figure 13:
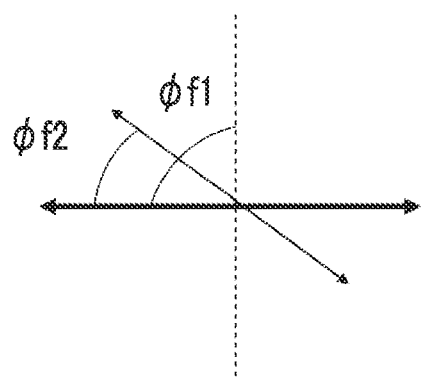
FIG. 13 is a schematic view showing a relationship of an angle between the absorption axis of the polarizer and the in-plane slow axis of each of the first optically anisotropic layer and the second optically anisotropic layer, upon observation from the direction of a white arrow in FIG. 12.

In addition, FIG. 13 is a view showing a relationship of the angle between the absorption axis (thick line) of the polarizer 12 and the in-plane slow axis (solid line) of each of the first optically anisotropic layer 14F and the second optically anisotropic layer 16F, upon observation from the white arrow in FIG. 12.

The angle of the in-plane slow axis represents counterclockwise as a positive angle value with the absorption axis of the polarizer 12 as 90°, upon observation from the white arrow in FIG. 12. In addition, the twisted angle of the liquid crystal compound is represented by a positive angle value in a counterclockwise direction and a negative angle value in a clockwise direction by determining whether the liquid crystal compound is right-hand twisted (clockwise) or left-hand twisted (counterclockwise) with reference to the in-plane slow axis on a surface 141F of the front side (the polarizer 12 side) in the first optically anisotropic layer 14F, upon observation from the white arrow in FIG. 12.

As shown in FIG. 12, the circularly polarizing plate 10F includes the polarizer 12, the first optically anisotropic layer 14F, and the second optically anisotropic layer 16F in this order.

As shown in FIG. 12 and FIG. 13, in a case where the absorption axis of the polarizer 12 is defined as 90°, the in-plane slow axis on the surface 141F of the first optically anisotropic layer 14F on the polarizer 12 side is 90°. More specifically, the in-plane slow axis on the surface 141F of the first optically anisotropic layer 14F on the polarizer 12 side is rotated by 90° (counterclockwise 90°) with respect to the direction (broken line in FIG. 13) orthogonal to the absorption axis of the polarizer 12. That is, an angle φf1 formed by the direction orthogonal to the absorption axis of the polarizer 12 and the in-plane slow axis on the surface 141F of the first optically anisotropic layer 14F on the polarizer 12 side is 90°.

FIG. 12 and FIG. 13 show an aspect in which the in-plane slow axis on the surface 141F of the first optically anisotropic layer 14F is located at a position of 90, but the present invention is not limited to this aspect. It is sufficient that the relationship of Expression (F-1) is satisfied. Specifically, it is sufficient that X is in a range of more than 70° and 110° or less.

As described above, the first optically anisotropic layer 14F is a layer formed by fixing a liquid crystal compound twist-aligned along a helical axis extending in a thickness direction. Therefore, the in-plane slow axis on the surface 141F of the first optically anisotropic layer 14F on the polarizer 12 side and the in-plane slow axis on a surface 142F of the first optically anisotropic layer 14F opposite to the polarizer 12 side forms a predetermined twisted angle. Specifically, as shown in FIG. 12 and FIG. 13, an angle φf2 formed by the in-plane slow axis on the surface 141F of the first optically anisotropic layer 14F on the polarizer 12 side and the in-plane slow axis on the surface 142F of the first optically anisotropic layer 14F opposite to the polarizer 12 side is −40°. More specifically, the twisted direction of the liquid crystal compound in the first optically anisotropic layer 14F is a right-handed twist (clockwise), and the twisted angle thereof is −40°.

FIG. 12 and FIG. 13 show an aspect in which the twisted direction of the liquid crystal compound in the first optically anisotropic layer 14F is a right-handed twist (clockwise), and the twisted angle thereof is −40°, but the present invention is not limited to this aspect. It is sufficient that the relationship of Expression (F-2) is satisfied. Specifically, it is sufficient that Y is in a range of −X+30° to −X+70°. More specifically, in a case where X is 90° as described above, Y may be in a range of −60° to −20°.

As shown in FIG. 12 and FIG. 13, the absorption axis of the polarizer 12 and the in-plane slow axis on the surface 161F of the second optically anisotropic layer 16F on the polarizer 12 side are orthogonal to each other.

The second optically anisotropic layer 16F is an A-plate, and the in-plane slow axis on the surface 161F of the second optically anisotropic layer 16F on the polarizer 12 side and the in-plane slow axis on a surface 162F of the second optically anisotropic layer 16F opposite to the polarizer 12 side are parallel to each other.

Method for Producing Circularly Polarizing Plate

The method for producing a circularly polarizing plate is not particularly limited, and a known method can be used.

For example, a circularly polarizing plate can be produced by preparing each of a polarizer, a first optically anisotropic layer, and a second optically anisotropic layer and bonding the prepared members in a predetermined order through an adhesion layer (for example, a pressure sensitive adhesive layer or an adhesive layer).

In addition, the first optically anisotropic layer and the second optically anisotropic layer can be produced by using compositions for forming an optically anisotropic layer containing a liquid crystal compound having a polymerizable group, which can be formed respectively.

Hereinafter, the method for producing an optically anisotropic layer (first optically anisotropic layer and second optically anisotropic layer) using the composition for forming an optically anisotropic layer containing a liquid crystal compound having a polymerizable group will be described in detail.

The liquid crystal compound having a polymerizable group (hereinafter, also referred to as "polymerizable liquid crystal compound") contained in the composition for forming an optically anisotropic layer is as described above. As described above, a rod-like liquid crystal compound and a disk-like liquid crystal compound are appropriately selected according to the characteristics of an optically anisotropic layer to be formed.

The content of the polymerizable liquid crystal compound in the composition for forming an optically anisotropic layer is preferably 60% to 99% by mass and more preferably 70% to 98% by mass with respect to the total solid content of the composition for forming an optically anisotropic layer.

The solid content means a component capable of forming an optically anisotropic layer, excluding a solvent, and even in a case where a component itself is in a liquid state, such a component is regarded as the solid content.

The composition for forming an optically anisotropic layer may contain a compound other than the liquid crystal compound having a polymerizable group.

For example, the composition for forming an optically anisotropic layer for forming the first optically anisotropic layer 14 preferably contains a chiral agent in order to twist-align a liquid crystal compound. The chiral agent is added to twist-align a liquid crystal compound, but of course, it is not necessary to add the chiral agent in a case where the liquid crystal compound is a compound exhibiting an optical activity such as having an asymmetric carbon in a molecule. In addition, it may not be necessary to add the chiral agent, depending on the production method and the twisted angle.

The chiral agent is not particularly limited in a structure thereof as long as it is compatible with the liquid crystal compound used in combination. Any of known chiral agents (for example, described in "Liquid Crystal Device Handbook" edited by the 142nd Committee of the Japan Society for the Promotion of Science, Chapter 3, 4-3, Chiral agents for TN and STN, p. 199, 1989) can be used.

The amount of the chiral agent used is not particularly limited and is adjusted such that the above-mentioned twisted angle is achieved.

The composition for forming an optically anisotropic layer may contain a polymerization initiator. The polymerization initiator used is selected according to the type of polymerization reaction, and examples thereof include a thermal polymerization initiator and a photopolymerization initiator.

The content of the polymerization initiator in the composition for forming an optically anisotropic layer is preferably 0.01% to 20% by mass and more preferably 0.5% to 10% by mass with respect to the total solid content of the composition for forming an optically anisotropic layer.

Examples of other components that may be contained in the composition for forming an optically anisotropic layer include a polyfunctional monomer, an alignment control agent (a vertical alignment agent and a horizontal alignment agent), a surfactant, an adhesion improver, a plasticizer, and a solvent, in addition to the foregoing components.

Examples of the method of applying the composition for forming an optically anisotropic layer include a curtain coating method, a dip coating method, a spin coating method, a printing coating method, a spray coating method, a slot coating method, a roll coating method, a slide coating method, a blade coating method, a gravure coating method, and a wire bar method.

Next, the formed coating film is subjected to an alignment treatment to align a polymerizable liquid crystal compound in the coating film.

The alignment treatment can be carried out by drying the coating film at room temperature or by heating the coating film. In a case of a thermotropic liquid crystal compound, the liquid crystal phase formed by the alignment treatment can generally be transferred by a change in temperature or pressure. In a case of a lyotropic liquid crystal compound, the liquid crystal phase formed by the alignment treatment can also be transferred by a compositional ratio such as an amount of solvent.

The conditions for heating the coating film are not particularly limited, and the heating temperature is preferably 50° C. to 250° C. and more preferably 50° C. to 150° C., and the heating time is preferably 10 seconds to 10 minutes.

In addition, after the coating film is heated, the coating film may be cooled, if necessary, before a curing treatment (light irradiation treatment) which will be described later.

Next, the coating film in which the polymerizable liquid crystal compound is aligned is subjected to a curing treatment.

The method of the curing treatment carried out on the coating film in which the polymerizable liquid crystal compound is aligned is not particularly limited, and examples thereof include a light irradiation treatment and a heat treatment. Above all, from the viewpoint of manufacturing suitability, a light irradiation treatment is preferable, and an ultraviolet irradiation treatment is more preferable.

The irradiation conditions of the light irradiation treatment are not particularly limited, and an irradiation amount of 50 to 1,000 mJ/cm$^2$ is preferable.

The atmosphere during the light irradiation treatment is not particularly limited and is preferably a nitrogen atmosphere.

Uses

The circularly polarizing plate according to the embodiment of the present invention is an optical element that converts unpolarized light into circularly polarized light.

The circularly polarizing plate according to the embodiment of the present invention is suitably used for antireflection applications of a display device such as a liquid crystal display device (LCD), a plasma display panel (PDP), an electroluminescent display (ELD), or a cathode tube display device (CRT).

Display Device

The circularly polarizing plate according to the embodiment of the present invention can be suitably applied to a display device.

The display device according to the embodiment of the present invention has a display element and the above-mentioned circularly polarizing plate.

The circularly polarizing plate is disposed on a viewing side of the display element, and a polarizer is disposed on the viewing side in the circularly polarizing plate.

The display element is not particularly limited, and examples thereof include an organic electroluminescence display element and a liquid crystal display element.

EXAMPLES

Hereinafter, features of the present invention will be described in more detail with reference to Examples and Comparative Examples. The materials, amounts used, proportions, treatment details, and treatment procedure shown in the following Examples can be appropriately changed without departing from the spirit and scope of the present invention. Therefore, the scope of the present invention should not be construed as being limited by the specific examples given below.

Example 1

(1) Preparation of First Optically Anisotropic Layer (Preparation of Cellulose Ester Solution a-1)

The following components were put into a mixing tank and stirred while heating to prepare a cellulose ester solution A-1.

Composition of Cellulose Ester Solution a-1

| | |
|---|---|
| Cellulose acetate (acetylation degree: 2.86) | 100 parts by mass |
| Methylene chloride (first solvent) | 320 parts by mass |
| Methanol (second solvent) | 83 parts by mass |
| 1-Butanol (third solvent) | 3 parts by mass |
| Triphenyl phosphate | 7.6 parts by mass |
| Biphenyl diphenyl phosphate | 3.8 parts by mass |

Preparation of Matting Agent Dispersion B-1

The following components were put into a disperser and stirred to prepare a matting agent dispersion B-1.

Composition of Matting Agent Dispersion B-1

| | |
|---|---|
| Silica particle dispersion (average particle diameter: 16 nm) "AEROSIL R972" manufactured by Nippon Aerosil Co., Ltd. | 10.0 parts by mass |
| Methylene chloride | 72.8 parts by mass |
| Methanol | 3.9 parts by mass |
| Butanol | 0.5 parts by mass |
| Cellulose ester solution A-1 | 10.3 parts by mass |

Preparation of Ultraviolet Absorber Solution C-1

The following components were put into another mixing tank and stirred while heating to prepare an ultraviolet absorber solution C-1.

Composition of Ultraviolet Absorber Solution C-1

| | |
|---|---|
| Ultraviolet absorber (UV-1 given below) | 10.0 parts by mass |
| Ultraviolet absorber (U V-2 given below) | 10.0 parts by mass |
| Methylene chloride | 55.7 parts by mass |
| Methanol | 10 parts by mass |
| Butanol | 1.3 parts by mass |
| Cellulose ester solution A-1 | 12.9 parts by mass |

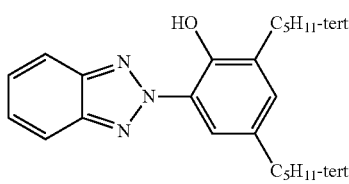

(UV-1)

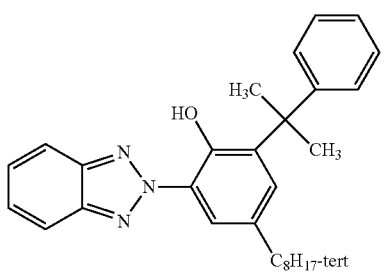

(UV-2)

Preparation of Cellulose Ester Film

The ultraviolet absorber solution C-1 was added to a mixture of the cellulose ester solution A-1 (94.6 parts by mass) and the matting agent dispersion B-1 (1.3 parts by mass) such that the ultraviolet absorber (UV-1) and the ultraviolet absorber (UV-2) were each 1.0 parts by mass per 100 parts by mass of cellulose acylate. Then, the components were dissolved by stirring while heating to prepare a dope.

The obtained dope was heated to 30° C. and cast on a mirror-finished stainless steel support, which is a drum having a diameter of 3 m, through a casting geeser. The surface temperature of the mirror-finished stainless steel support was set to −5° C., and the coating width was 1470 mm. The cast dope film was dried on a drum by applying a drying air at 34° C. at 150 m³/min, and peeled off from the drum with a residual solvent of 150%. At the time of peeling the film, 15% stretching was carried out in a transport direction (longitudinal direction). Thereafter, the film was transported while grasping both ends in the width direction of the film (direction orthogonal to the casting direction) with a pin tenter (pin tenter shown in FIG. 3 of JP1992-001009A (JP-H04-001009A), and no stretching treatment was carried out in a width direction. Further, the obtained film was transported between rolls of a heat treatment apparatus to be further dried to produce a cellulose acylate film (T1). The prepared elongated cellulose acylate film (T1) had a residual solvent amount of 0.2% by mass, a thickness of 60 μm, Re (in-plane retardation) of 0.8 nm at a wavelength of 550 nm, and Rth (thickness direction retardation) of 40 nm at a wavelength of 550 nm.

Alkali Saponification Treatment

After passing the above-mentioned cellulose acylate film (T1) through a dielectric heating roll at a temperature of 60° C. to raise the film surface temperature to 40° C., an alkaline solution having the composition shown below was applied onto a band surface of the film using a bar coater at an application amount of 14 ml/m², and the obtained film was transported under a steam type far-infrared heater (manufactured by Noritake Company Limited) heated to 110° C. for 10 seconds. Subsequently, pure water was applied to the obtained film at 3 ml/m² using the same bar coater. Next, the obtained film was washed with water by a fountain coater and drained by an air knife three times, and then transported to a drying zone at 70° C. for 10 seconds and dried to obtain a cellulose acylate film subjected to an alkali saponification treatment.

Composition of Alkaline Solution

| Potassium hydroxide | 4.7 parts by mass |
| Water | 15.8 parts by mass |
| Isopropanol | 63.7 parts by mass |
| Surfactant SF-1: $C_{14}H_{29}O(CH_2CH_2O)_{20}H$ | 1.0 parts by mass |
| Propylene glycol | 14.8 parts by mass |

Formation of Alignment Film

An alignment film coating liquid (A) having the following composition was continuously applied onto the surface of the cellulose acylate film (T1) that had been subjected to the alkali saponification treatment with a #14 wire bar. The film on which the coating film was disposed was dried with hot air at 60° C. for 60 seconds and further with hot air at 100° C. for 120 seconds.

The degree of saponification of the modified polyvinyl alcohol used was 88%.

Composition of Alignment Film Coating Liquid (A)

| Modified polyvinyl alcohol given below | 10 parts by mass |
| Water | 308 parts by mass |
| Methanol | 70 parts by mass |
| Isopropanol | 29 parts by mass |
| Photopolymerization initiator (IRGACURE 2959, manufactured by BASF Japan Ltd.) | 0.8 parts by mass |

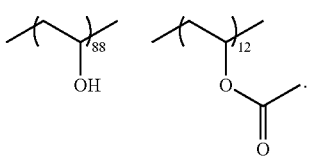

Formation of First Optically Anisotropic Layer

The alignment film prepared above was continuously subjected to a rubbing treatment. At this time, the longitudinal direction and the transport direction of the elongated film were parallel to each other, and the angle between the longitudinal direction (transport direction) of the film and the rotation axis of the rubbing roller was set to 40° (In a case where the longitudinal direction (transport direction) of the film is defined as 90° and the counterclockwise direction is expressed as a positive value with the film width direction as a reference (0°) upon observing from the alignment film side, the rotation axis of the rubbing roller is −50°. In other words, the position of the rotation axis of the rubbing roller corresponds to the position rotated by 40° counterclockwise with reference to the longitudinal direction of the film).

The following composition (A) for forming an optically anisotropic layer containing a rod-like liquid crystal compound was applied onto the rubbing-treated film using a geeser coating machine to form a composition layer.

Next, the obtained composition layer was heated at 100° C. for 80 seconds, and then the composition layer was irradiated with ultraviolet rays (irradiation amount: 500 mJ/cm²) using a metal halide lamp (manufactured by Eye Graphics Co., Ltd.) at 57° C. in a nitrogen atmosphere to form a first optically anisotropic layer in which an alignment state of a liquid crystal compound was fixed, whereby an optical film (A) was prepared.

| | |
|---|---|
| Rod-like liquid crystal compound (A) given below | 80 parts by mass |
| Rod-like liquid crystal compound (B) given below | 3 parts by mass |
| Rod-like liquid crystal compound (C) given below | 17 parts by mass |
| Ethylene oxide-modified trimethylolpropane triacrylate (V# 360, manufactured by Osaka Organic Chemical Industry Ltd.) | 4 parts by mass |
| Photopolymerization initiator (IRGACURE 819, manufactured by BASF Japan Ltd.) | 3 parts by mass |
| Chiral agent (A) given below | 0.11 parts by mass |
| Polymer (A) given below | 0.08 parts by mass |
| Methyl isobutyl ketone | 117 parts by mass |
| Ethyl propionate | 39 parts by mass |

Chiral Agent (A)

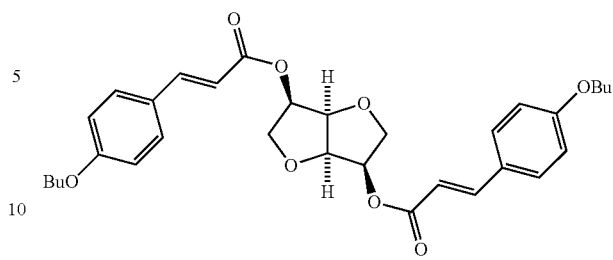

Rod-Like Liquid Crystal Compound (A) (Hereinafter, a Mixture of Compounds)

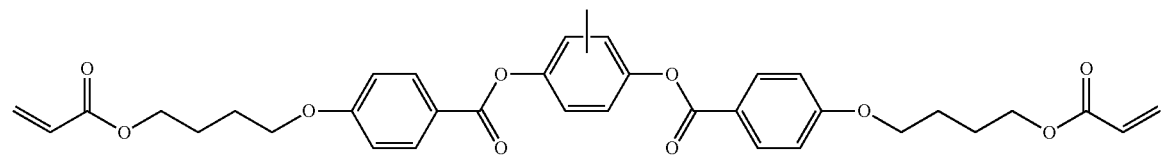

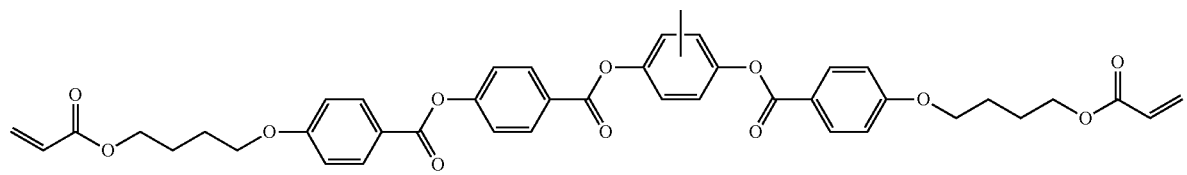

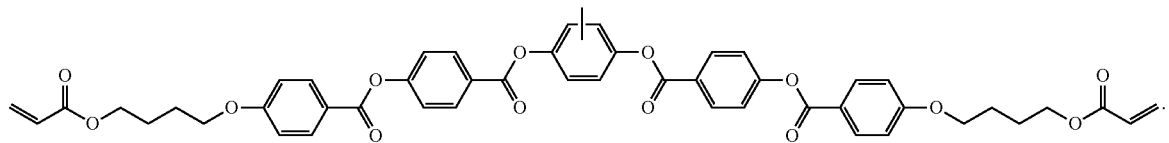

Rod-Like Liquid Crystal Compound (B)

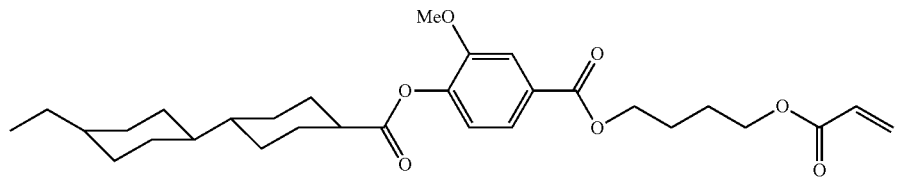 [SMILES: C=CC(=O)OCCCCOC(=O)c1ccc(OC(=O)C2CCC(C3CCC(CC)CC3)CC2)c(OC)c1]

Rod-Like Liquid Crystal Compound (C)

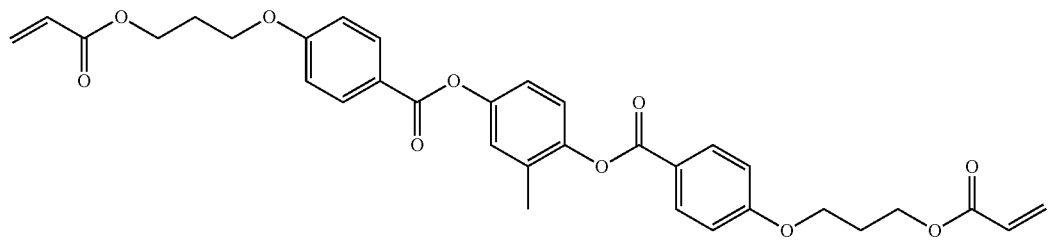 [SMILES: C=CC(=O)OCCCOc1ccc(C(=O)Oc2ccc(OC(=O)c3ccc(OCCCOC(=O)C=C)cc3)c(C)c2)cc1]

Polymer (A) (In the formula, the numerical value described in each repeating unit represents the content (% by mass) of each repeating unit with respect to all the repeating units).

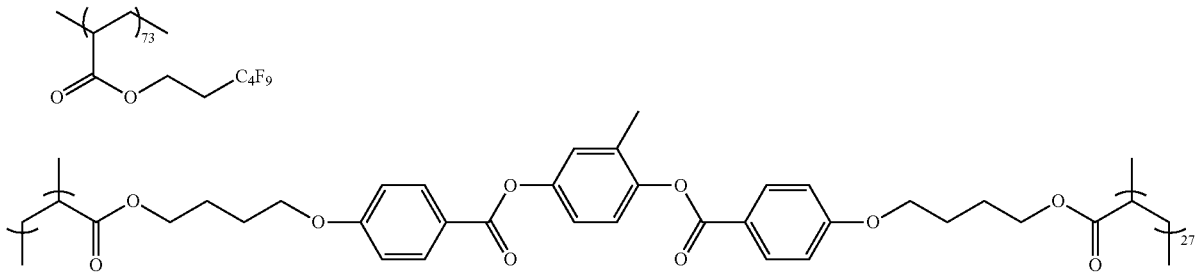

The optical properties of the first optically anisotropic layer prepared above were determined using Axoscan of Axometrics, Inc. and analysis software (Multi-Layer Analysis) of Axometrics, Inc. The product (Δnd) of Δn at a wavelength of 550 nm and the thickness d was 347 nm, the twisted angle of the liquid crystal compound was 40°, and the alignment axis angle of the liquid crystal compound with respect to the width direction of the film was 40° on the alignment film side and 0° on the air side.

The alignment axis angle of the liquid crystal compound contained in the first optically anisotropic layer is expressed as negative in a case where it is clockwise (right hand turning) and positive in a case where it is counterclockwise (left hand turning), with the width direction of the film as a reference of 0°, upon observing from the air side of the first optically anisotropic layer.

In addition, the twisted angle of the liquid crystal compound here is expressed as negative in a case where the alignment direction of the liquid crystal compound on the film side (back side) is clockwise (right hand turning) and positive in a case where it is counterclockwise (left hand turning), with reference to the alignment direction of the liquid crystal compound on the air side (front side), upon observing from the air side of the first optically anisotropic layer.

(2) Preparation of Second Optically Anisotropic Layer

An alignment film was formed on the cellulose acylate film (T1) in the same manner as in the section of "Preparation of first optically anisotropic layer", and the alignment film was continuously subjected to a rubbing treatment. At this time, the longitudinal direction and the transport direction of the elongated film were parallel to each other, and the angle between the longitudinal direction (transport direction) of the film and the rotation axis of the rubbing roller was set to 90° (In a case where the longitudinal direction (transport direction) of the film is defined as 90° and the counterclockwise direction is expressed as a positive value with reference to the film width direction upon observing from the alignment film side, the rotation axis of the rubbing roller is 0°. In other words, the position of the rotation axis of the rubbing roller corresponds to the position rotated by 90° counterclockwise with reference to the longitudinal direction of the film).

The following composition (B) for forming an optically anisotropic layer containing a rod-like liquid crystal compound was applied onto the rubbing-treated film using a geeser coating machine to form a composition layer.

Next, the obtained composition layer was heated at 100° C. for 80 seconds, and then the composition layer was irradiated with ultraviolet rays (irradiation amount: 500 mJ/cm²) using a metal halide lamp (manufactured by Eye Graphics Co., Ltd.) at 57° C. in a nitrogen atmosphere to form a second optically anisotropic layer (A-plate) in which an alignment state of a liquid crystal compound was fixed, whereby an optical film (B) was prepared.

| | |
|---|---|
| Rod-like liquid crystal compound (A) given above | 80 parts by mass |
| Rod-like liquid crystal compound (B) given above | 3 parts by mass |
| Rod-like liquid crystal compound (C) given above | 17 parts by mass |
| Ethylene oxide-modified trimethylolpropane triacrylate (V# 360, manufactured by Osaka Organic Chemical Industry Ltd.) | 4 parts by mass |
| Photopolymerization initiator (IRGACURE 819, manufactured by BASF Japan Ltd.) | 3 parts by mass |
| Polymer (A) given above | 0.08 parts by mass |
| Methyl isobutyl ketone | 117 parts by mass |
| Ethyl propionate | 39 parts by mass |

The optical properties of the second optically anisotropic layer prepared above were determined using Axoscan of Axometrics, Inc. and analysis software (Multi-Layer Analysis) of Axometrics, Inc. The in-plane retardation at a wavelength of 550 nm was 97.5 nm, the twisted angle of the liquid crystal compound was 0°, and the alignment axis angle of the liquid crystal compound with respect to the longitudinal direction of the film was 90° on both the alignment film side and the air side.

The alignment axis angle of the liquid crystal compound contained in the second optically anisotropic layer is expressed as negative in a case where it is clockwise (right hand turning) and positive in a case where it is counterclockwise (left hand turning), with the width direction of the film as a reference of 0°, upon observing from the air side of the second optically anisotropic layer.

(3) Preparation of Polarizer

A polyvinyl alcohol (PVA) film having a thickness of 80 μm was immersed in an iodine aqueous solution having an iodine concentration of 0.05% by mass at 30° C. for 60 seconds for dyeing. Next, the film was machine-direction stretched 5 times its original length while immersed in a boric acid aqueous solution having a boric acid concentration of 4% by mass for 60 seconds, and then dried at 50° C. for 4 minutes to obtain a polarizer having a thickness of 20 μm.

A commercially available cellulose acylate-based film "TD80UL" (manufactured by FUJIFILM Corporation) was prepared and immersed in a sodium hydroxide aqueous solution at 1.5 mol/liter at 55° C., and then the sodium hydroxide was thoroughly washed away with water. Thereafter, the film was immersed in a dilute sulfuric acid aqueous solution at 0.005 mol/liter at 35° C. for 1 minute, and then immersed in water to thoroughly wash away the dilute sulfuric acid aqueous solution. Finally, the sample was sufficiently dried at 120° C. to prepare a polarizer protective film.

The above prepared polarizer protective film was bonded to one side of the above prepared polarizer with a polyvinyl alcohol-based adhesive to prepare a polarizing plate including a polarizer and a polarizer protective film disposed on one side of the polarizer.

A pressure sensitive adhesive (SK-2057, manufactured by Soken Chemical & Engineering Co., Ltd.) was applied to the polarizer side (side with no polarizer protective film) in the above prepared polarizing plate to form a pressure sensitive adhesive layer, and the above prepared optical film (A) having a cellulose acylate film, an alignment film, and a first optically anisotropic layer was bonded such that the pressure sensitive adhesive layer and the first optically anisotropic layer were closely attached to each other. Then, the cellulose acylate film and the alignment film were peeled off to obtain a laminate.

Next, a pressure sensitive adhesive (SK-2057, manufactured by Soken Chemical & Engineering Co., Ltd.) was applied to the first optically anisotropic layer in the obtained laminate to form a pressure sensitive adhesive layer. Next, the laminate on which the pressure sensitive adhesive layer was disposed and the above prepared optical film (B) having a cellulose acylate film, an alignment film, and a second optically anisotropic layer were bonded such that the pressure sensitive adhesive layer and the second optically anisotropic layer were closely attached to each other. Then, the cellulose acylate film and the alignment film were peeled off.

A circularly polarizing plate 1 having a polarizer, a first optically anisotropic layer, and a second optically anisotropic layer disposed in this order was prepared by the above procedure.

Example 2

Formation of First Optically Anisotropic Layer

An alignment film was formed on the cellulose acylate film (T1) in the same manner as in Example 1, and the alignment film was continuously subjected to a rubbing treatment. At this time, the longitudinal direction and the transport direction of the elongated film were parallel to each other, and the angle between the longitudinal direction (transport direction) of the film and the rotation axis of the rubbing roller was set to 400 (In a case where the longitudinal direction (transport direction) of the film is defined as 90° and the counterclockwise direction is expressed as a positive value with the film width direction as a reference (0°) upon observing from the alignment film side, the rotation axis of the rubbing roller is 50°. In other words, the position of the rotation axis of the rubbing roller corresponds to the position rotated by 40° clockwise with reference to the longitudinal direction of the film).

The following composition (C) for forming an optically anisotropic layer containing a rod-like liquid crystal compound was applied onto the rubbing-treated film using a geeser coating machine to form a composition layer.

Next, the obtained composition layer was heated at 100° C. for 80 seconds, and then the composition layer was irradiated with ultraviolet rays (irradiation amount: 500 mJ/cm$^2$) using a metal halide lamp (manufactured by Eye Graphics Co., Ltd.) at 57° C. in a nitrogen atmosphere to form a first optically anisotropic layer in which an alignment state of a liquid crystal compound was fixed, whereby an optical film (C) was prepared.

| | |
|---|---|
| Rod-like liquid crystal compound (A) given above | 80 parts by mass |
| Rod-like liquid crystal compound (B) given above | 3 parts by mass |
| Rod-like liquid crystal compound (C) given above | 17 parts by mass |
| Ethylene oxide-modified trimethylolpropane triacrylate (V# 360, manufactured by Osaka Organic Chemical Industry Ltd.) | 4 parts by mass |
| Photopolymerization initiator (IRGACURE 819, manufactured by BASF Japan Ltd.) | 3 parts by mass |
| Chiral agent (B) given below | 0.10 parts by mass |
| Polymer (A) given above | 0.08 parts by mass |
| Methyl isobutyl ketone | 117 parts by mass |
| Ethyl propionate | 39 parts by mass |

Chiral Agent B

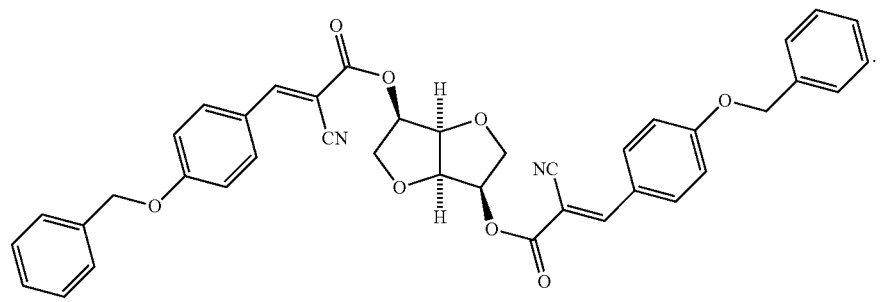 [SMILES: N#C/C(=C\c1ccc(OCc2ccccc2)cc1)C(=O)O[C@@H]1CO[C@H]2[C@@H]1OC[C@H]2OC(=O)/C(C#N)=C/c1ccc(OCc2ccccc2)cc1]

The optical properties of the first optically anisotropic layer prepared above were determined using Axoscan of Axometrics, Inc. and analysis software (Multi-Layer Analysis) of Axometrics, Inc. The product (Δnd) of Δn at a wavelength of 550 nm and the thickness d was 347 nm, the twisted angle of the liquid crystal compound was −40°, and the alignment axis angle of the liquid crystal compound with respect to the width direction of the film was −40° on the alignment film side and 0° on the air side.

The alignment axis angle of the liquid crystal compound contained in the first optically anisotropic layer is expressed as negative in a case where it is clockwise (right hand turning) and positive in a case where it is counterclockwise (left hand turning), with the width direction of the film as a reference of 0°, upon observing from the air side of the first optically anisotropic layer.

In addition, the twisted structure of the liquid crystal compound here is expressed as negative in a case where the alignment direction of the liquid crystal compound on the film side (back side) is clockwise (right hand turning) and positive in a case where it is counterclockwise (left hand turning), with reference to the alignment direction of the liquid crystal compound on the air side (front side), upon observing from the air side of the first optically anisotropic layer.

Thereafter, a second optically anisotropic layer and a circularly polarizing plate 2 were prepared in the same manner as in Example 1.

Examples 3 to 14, 17 to 40, and 43 to 52, and Comparative Examples 1 to 6

A circularly polarizing plate was prepared in the same manner as in Example 1, except that the rubbing treatment angle of the alignment film, the type of chiral agent ((A) or (B)) in the first optically anisotropic layer, the amount, the application amount, and the application amount of the second optically anisotropic layer were adjusted to obtain the desired optical properties.

Examples 15, 16, 41, and 42

A circularly polarizing plate was prepared in the same manner as in Examples 1, 2, 27, and 28, except that a cycloolefin polymer film (trade name: ARTON film, Re=95 nm, manufactured by JSR Corporation) was used for the second optically anisotropic layer.
Evaluation The SAMSUNG GALAXY S4 equipped with an organic EL panel (an organic EL display element) was disassembled, a touch panel with a circularly polarizing plate was peeled off from the organic EL display device, and the circularly polarizing plate prepared in each of the foregoing Examples and Comparative Examples was bonded to the display device so as not to allow air to enter, whereby an organic EL display device was prepared.

In a sunlight environment, the tint variation in the front direction in the black display of the above prepared organic EL display device with a circularly polarizing plate was evaluated according to the following standards. Practically, the evaluation of B or higher is preferable.

A: The tint variation is not visible at all.
B: Although the tint variation is visible, it is very slight.
C: The tint variation is visible, and there is also reflected light.

The column of "Relationship between polarizer and second layer" in the tables represents the relationship between the absorption axis of the polarizer and the in-plane slow axis of the second optically anisotropic layer, "Parallel" means that the absorption axis of the polarizer and the in-plane slow axis of the second optically anisotropic layer are parallel to each other, and "Orthogonal" means that the absorption axis of the polarizer and the in-plane slow axis of the second optically anisotropic layer are orthogonal to each other.

The column of "Polarizer absorption axis [°]" in the tables represents the position of the absorption axis of the polarizer in a case where the counterclockwise direction is represented by a positive angle value, with the width direction of the film as a reference of 0°.

The column of "Material of first layer" in the tables represents the material used for forming the first optically anisotropic layer, and the "Rod-like liquid crystal" represents the rod-like liquid crystal compound.

The column of "Δnd of first layer" in the tables represents the product Δnd of the refractive index anisotropy Δn of the first optically anisotropic layer at a wavelength of 550 nm and the thickness d of the first optically anisotropic layer.

The column of "Material of second layer" in the table represents the material used for forming the second optically anisotropic layer, "Rod-like liquid crystal" represents the rod-like liquid crystal compound, and "COP" represents the cycloolefin polymer.

The column of "Re of second layer" in the tables represents the in-plane retardation Re(550) of the second optically anisotropic layer at a wavelength of 550 nm.

The column "Axis X [°] of first layer on polarizer side" in the tables represents the angle (°) of the in-plane slow axis on the surface of the first optically anisotropic layer on the polarizer side in a case of observing the circularly polarizing plate from the polarizer side, and expressing a counterclockwise direction as a positive angle value and a clockwise direction as a negative angle value, with the absorption axis of the polarizer as 90°.

The column of "Twisted angle Y [°] of first layer" in the table represents the twisted angle (°) of the liquid crystal compound in the first optically anisotropic layer.

The column of "Axis [°] of second layer" in the tables represents the position of the in-plane slow axis of the second optically anisotropic layer in a case where the counterclockwise direction is represented by a positive angle value, with the width direction of the film as a reference of 0°.

The second optically anisotropic layer of each of Examples was an A-plate.

TABLE 1

| | Relationship between polarizer and second layer | Polarizer absorption axis [°] | Material of first layer | Δnd of first layer [nm] | Material of second layer | Re of second layer [nm] | Axis X of first layer on polarizer side [°] | Twisted angle Y of first layer [°] | Axis of second layer [°] | Evaluation |
|---|---|---|---|---|---|---|---|---|---|---|
| Example 1 | Parallel | 90 | Rod-like liquid crystal | 347 | Rod-like liquid crystal | 97.5 | 0 | 40 | 90 | A |
| Example 2 | Parallel | 90 | Rod-like liquid crystal | 347 | Rod-like liquid crystal | 97.5 | 0 | −40 | 90 | A |
| Example 3 | Parallel | 90 | Rod-like liquid crystal | 347 | Rod-like liquid crystal | 97.5 | 0 | 30 | 90 | A |
| Example 4 | Parallel | 90 | Rod-like liquid crystal | 347 | Rod-like liquid crystal | 97.5 | 0 | 50 | 90 | A |
| Example 5 | Parallel | 90 | Rod-like liquid crystal | 347 | Rod-like liquid crystal | 97.5 | 0 | −30 | 90 | A |
| Example 6 | Parallel | 90 | Rod-like liquid crystal | 347 | Rod-like liquid crystal | 97.5 | 0 | −50 | 90 | A |
| Example 7 | Parallel | 90 | Rod-like liquid crystal | 347 | Rod-like liquid crystal | 97.5 | 19 | 20 | 90 | A |

TABLE 1-continued

| | Relationship between polarizer and second layer | Polarizer absorption axis [°] | Material of first layer | Δnd of first layer [nm] | Material of second layer | Re of second layer [nm] | Axis X of first layer on polarizer side [°] | Twisted angle Y of first layer [°] | Axis of second layer [°] | Evaluation |
|---|---|---|---|---|---|---|---|---|---|---|
| Example 8 | Parallel | 90 | Rod-like liquid crystal | 347 | Rod-like liquid crystal | 97.5 | 20 | −60 | 90 | A |
| Example 9 | Parallel | 90 | Rod-like liquid crystal | 347 | Rod-like liquid crystal | 97.5 | 160 | 60 | 90 | A |
| Example 10 | Parallel | 90 | Rod-like liquid crystal | 347 | Rod-like liquid crystal | 97.5 | 161 | −20 | 90 | A |
| Example 11 | Parallel | 90 | Rod-like liquid crystal | 367 | Rod-like liquid crystal | 97.5 | 0 | 40 | 90 | A |
| Example 12 | Parallel | 90 | Rod-like liquid crystal | 327 | Rod-like liquid crystal | 97.5 | 0 | 40 | 90 | A |
| Example 13 | Parallel | 90 | Rod-like liquid crystal | 347 | Rod-like liquid crystal | 117.5 | 0 | 40 | 90 | A |
| Example 14 | Parallel | 90 | Rod-like liquid crystal | 347 | Rod-like liquid crystal | 77.5 | 0 | 40 | 90 | A |
| Example 15 | Parallel | 90 | Rod-like liquid crystal | 347 | COP | 95 | 0 | 40 | 90 | A |
| Example 16 | Parallel | 90 | Rod-like liquid crystal | 347 | COP | 95 | 0 | −40 | 90 | A |
| Example 17 | Parallel | 90 | Rod-like liquid crystal | 347 | Rod-like liquid crystal | 97.5 | 0 | 20 | 90 | B |
| Example 18 | Parallel | 90 | Rod-like liquid crystal | 347 | Rod-like liquid crystal | 97.5 | 0 | 60 | 90 | B |
| Example 19 | Parallel | 90 | Rod-like liquid crystal | 347 | Rod-like liquid crystal | 97.5 | 0 | −20 | 90 | B |
| Example 20 | Parallel | 90 | Rod-like liquid crystal | 347 | Rod-like liquid crystal | 97.5 | 0 | −60 | 90 | B |
| Example 21 | Parallel | 90 | Rod-like liquid crystal | 347 | Rod-like liquid crystal | 97.5 | 19 | 1 | 90 | B |
| Example 22 | Parallel | 90 | Rod-like liquid crystal | 347 | Rod-like liquid crystal | 97.5 | 161 | −40 | 90 | B |
| Example 23 | Parallel | 90 | Rod-like liquid crystal | 377 | Rod-like liquid crystal | 97.5 | 0 | 40 | 90 | B |
| Example 24 | Parallel | 90 | Rod-like liquid crystal | 317 | Rod-like liquid crystal | 97.5 | 0 | 40 | 90 | B |
| Example 25 | Parallel | 90 | Rod-like liquid crystal | 347 | Rod-like liquid crystal | 127.5 | 0 | 40 | 90 | B |
| Example 26 | Parallel | 90 | Rod-like liquid crystal | 347 | Rod-like liquid crystal | 67.5 | 0 | 40 | 90 | B |

TABLE 2

| | Relationship between polarizer and second layer | Polarizer absorption axis [°] | Material of first layer | Δnd of first layer [nm] | Material of second layer | Re of second layer [nm] | Axis X of first layer on polarizer side [°] | Twisted angle Y of first layer [°] | Axis of second layer [°] | Evaluation |
|---|---|---|---|---|---|---|---|---|---|---|
| Example 27 | Orthogonal | 90 | Rod-like liquid crystal | 347 | Rod-like liquid crystal | 97.5 | 90 | 40 | 0 | A |
| Example 28 | Orthogonal | 90 | Rod-like liquid crystal | 347 | Rod-like liquid crystal | 97.5 | 90 | −40 | 0 | A |
| Example 29 | Orthogonal | 90 | Rod-like liquid crystal | 347 | Rod-like liquid crystal | 97.5 | 90 | 30 | 0 | A |
| Example 30 | Orthogonal | 90 | Rod-like liquid crystal | 347 | Rod-like liquid crystal | 97.5 | 90 | 50 | 0 | A |
| Example 31 | Orthogonal | 90 | Rod-like liquid crystal | 347 | Rod-like liquid crystal | 97.5 | 90 | −30 | 0 | A |
| Example 32 | Orthogonal | 90 | Rod-like liquid crystal | 347 | Rod-like liquid crystal | 97.5 | 90 | −50 | 0 | A |
| Example 33 | Orthogonal | 90 | Rod-like liquid crystal | 347 | Rod-like liquid crystal | 97.5 | 70 | 60 | 0 | A |
| Example 34 | Orthogonal | 90 | Rod-like liquid crystal | 347 | Rod-like liquid crystal | 97.5 | 71 | −20 | 0 | A |
| Example 35 | Orthogonal | 90 | Rod-like liquid crystal | 347 | Rod-like liquid crystal | 97.5 | 109 | 20 | 0 | A |
| Example 36 | Orthogonal | 90 | Rod-like liquid crystal | 347 | Rod-like liquid crystal | 97.5 | 110 | −60 | 0 | A |
| Example 37 | Orthogonal | 90 | Rod-like liquid crystal | 367 | Rod-like liquid crystal | 97.5 | 98 | 40 | 0 | A |
| Example 38 | Orthogonal | 90 | Rod-like liquid crystal | 327 | Rod-like liquid crystal | 97.5 | 90 | 40 | 0 | A |

TABLE 2-continued

|  | Relationship between polarizer and second layer | Polarizer absorption axis [°] | Material of first layer | Δnd of first layer [nm] | Material of second layer | Re of second layer [nm] | Axis X of first layer on polarizer side [°] | Twisted angle Y of first layer [°] | Axis of second layer [°] | Evaluation |
|---|---|---|---|---|---|---|---|---|---|---|
| Example 39 | Orthogonal | 90 | Rod-like liquid crystal | 347 | Rod-like liquid crystal | 117.5 | 90 | 40 | 0 | A |
| Example 40 | Orthogonal | 90 | Rod-like liquid crystal | 347 | Rod-like liquid crystal | 77.5 | 90 | 40 | 0 | A |
| Example 41 | Orthogonal | 90 | Rod-like liquid crystal | 347 | COP | 95 | 90 | 40 | 0 | A |
| Example 42 | Orthogonal | 90 | Rod-like liquid crystal | 347 | COP | 95 | 90 | -40 | 0 | A |
| Example 43 | Orthogonal | 90 | Rod-like liquid crystal | 347 | Rod-like liquid crystal | 97.5 | 90 | 20 | 0 | B |
| Example 44 | Orthogonal | 90 | Rod-like liquid crystal | 347 | Rod-like liquid crystal | 97.5 | 90 | 60 | 0 | B |
| Example 45 | Orthogonal | 90 | Rod-like liquid crystal | 347 | Rod-like liquid crystal | 97.5 | 90 | -20 | 0 | B |
| Example 46 | Orthogonal | 90 | Rod-like liquid crystal | 347 | Rod-like liquid crystal | 97.5 | 90 | -60 | 0 | B |
| Example 47 | Orthogonal | 90 | Rod-like liquid crystal | 347 | Rod-like liquid crystal | 97.5 | 71 | -40 | 0 | B |
| Example 48 | Orthogonal | 90 | Rod-like liquid crystal | 347 | Rod-like liquid crystal | 97.5 | 109 | 1 | 0 | B |
| Example 49 | Orthogonal | 90 | Rod-like liquid crystal | 377 | Rod-like liquid crystal | 97.5 | 90 | 40 | 0 | B |
| Example 50 | Orthogonal | 90 | Rod-like liquid crystal | 317 | Rod-like liquid crystal | 97.5 | 90 | 40 | 0 | B |
| Example 51 | Orthogonal | 90 | Rod-like liquid crystal | 347 | Rod-like liquid crystal | 127.5 | 90 | 40 | 0 | B |
| Example 52 | Orthogonal | 90 | Rod-like liquid crystal | 347 | Rod-like liquid crystal | 67.5 | 90 | 40 | 0 | B |

TABLE 3

|  | Relationship between polarizer and second layer | Polarizer absorption axis [°] | Material of first layer | Δnd of first layer [nm] | Material of second layer | Re of second layer [nm] | Axis X of first layer on polarizer side [°] | Twisted angle Y of first layer [°] | Axis of second layer [°] | Evaluation |
|---|---|---|---|---|---|---|---|---|---|---|
| Comparative Example 1 | Parallel | 90 | Rod-like liquid crystal | 286 | Rod-like liquid crystal | 97.5 | 95 | 28.6 | 90 | C |
| Comparative Example 2 | Parallel | 90 | Rod-like liquid crystal | 271 | Rod-like liquid crystal | 99.5 | 79.7 | 23.9 | 90 | C |
| Comparative Example 3 | Orthogonal | 90 | Rod-like liquid crystal | 286 | Rod-like liquid crystal | 97.5 | 5 | 28.6 | 0 | C |
| Comparative Example 4 | Orthogonal | 90 | Rod-like liquid crystal | 271 | Rod-like liquid crystal | 99.5 | 169.7 | 23.9 | 0 | C |
| Comparative Example 5 | Parallel | 90 | Rod-like liquid crystal | 347 | Rod-like liquid crystal | 97.5 | 0 | 70 | 90 | C |
| Comparative Example 6 | Orthogonal | 90 | Rod-like liquid crystal | 347 | Rod-like liquid crystal | 97.5 | 90 | 70 | 0 | C |

As shown in the above tables, it was confirmed that the desired effect can be obtained by using the circularly polarizing plate according to the embodiment of the present invention.

In addition, from the above tables, it was confirmed that a more excellent effect can be obtained in a case where any of the requirements 1-1 to 6-1 is satisfied.

EXPLANATION OF REFERENCES

10, 10A, 10B, 10C, 10D, 10E, 10F: circularly polarizing plate
12: polarizer
14, 14A, 14B, 14C, 14D, 14E, 14F: first optically anisotropic layer
16, 16A, 16B, 16C, 16D, 16E, 16F: second optically anisotropic layer

What is claimed is:
1. A circularly polarizing plate comprising:
a polarizer;
a first optically anisotropic layer; and
a second optically anisotropic layer in this order,
wherein the first optically anisotropic layer is a layer formed by fixing a liquid crystal compound twist-aligned along a helical axis extending in a thickness direction,
the second optically anisotropic layer is an A-plate,
an absorption axis of the polarizer and an in-plane slow axis of the second optically anisotropic layer are parallel or orthogonal to each other,
a value of a product Δnd of a refractive index anisotropy Δn of the first optically anisotropic layer at a wavelength of 550 nm and a thickness d of the first optically anisotropic layer satisfies a relationship of Expression (1), an in-plane retardation Re (550) of the second optically anisotropic layer at a wavelength of 550 nm satisfies a relationship of Expression (2), $$317 \text{ nm} \leq \Delta nd \leq 377 \text{ nm} \quad \text{Expression (1)}$$

$$67.5 \text{ nm} \leq Re(550) \leq 127.5 \text{ nm} \quad \text{Expression (2)}$$

in a case of observing the circularly polarizing plate from a polarizer side, and expressing a counterclockwise direction as a positive angle value with the absorption axis of the polarizer as 90°, an angle of an in-plane slow axis on a surface of the first optically anisotropic layer on the polarizer side is defined as X, and in a case of observing the circularly polarizing plate from the polarizer side, and expressing the counterclockwise direction as the positive angle value and a clockwise direction as a negative angle value, with reference to the in-plane slow axis on the surface of the first optically anisotropic layer on the polarizer side, a twisted angle of the liquid crystal compound in the first optically anisotropic layer is defined as Y, in a case where the absorption axis of the polarizer and the in-plane slow axis of the second optically anisotropic layer are parallel to each other, the X and the Y satisfy any of Requirements 1 to 4, and $$0° \leq X < 20° \text{ and } -X+20° \leq Y \leq -X+60° \quad \text{Requirement 1:}$$

$$0° \leq X \leq 20° \text{ and } -X-60° \leq Y \leq -X-20 \quad \text{Requirement 2:}$$

$$160° \leq X \leq 180° \text{ and } -X+200° \leq Y \leq -X+240° \quad \text{Requirement 3:}$$

$$160° < X \leq 180° \text{ and } -X+120° \leq Y \leq -X+160° \quad \text{Requirement 4:}$$

in a case where the absorption axis of the polarizer and the in-plane slow axis of the second optically anisotropic layer are orthogonal to each other, the X and the Y satisfy Requirement 5 or 6, $$70° \leq X < 110° \text{ and } -X+110° \leq Y \leq -X+150° \quad \text{Requirement 5:}$$

$$70° < X \leq 110° \text{ and } -X+30° \leq Y \leq -X+70°. \quad \text{Requirement 6:}$$

2. A display device comprising:
the circularly polarizing plate according to claim 1.

3. The circularly polarizing plate according to claim 1,
wherein the value of the product $\Delta nd$ of the refractive index anisotropy $\Delta n$ of the first optically anisotropic layer at a wavelength of 550 nm and the thickness d of the first optically anisotropic layer satisfies a relationship of Expression (1-1),
the in-plane retardation Re (550) of the second optically anisotropic layer at a wavelength of 550 nm satisfies a relationship of Expression (2-1), $$327 \text{ nm} \leq \Delta nd \leq 367 \text{ nm} \quad \text{Expression (1-1)}$$

$$77.5 \text{ nm} \leq Re(550) \leq 117.5 \text{ nm} \quad \text{Expression (2-1)}$$

in a case where the absorption axis of the polarizer and the in-plane slow axis of the second optically anisotropic layer are parallel to each other, the X and the Y satisfy any of Requirements 1-1 to 4-1, and $$0° \leq X < 20° \text{ and } -X+20° \leq Y \leq -X+60° \quad \text{Requirement 1:}$$

$$0° \leq X \leq 20° \text{ and } -X-60° \leq Y \leq -X-20 \quad \text{Requirement 2:}$$

$$160° \leq X \leq 180° \text{ and } -X+200° \leq Y \leq -X+240° \quad \text{Requirement 3:}$$

$$160° < X \leq 180° \text{ and } -X+120° \leq Y \leq -X+160° \quad \text{Requirement 4:}$$

in a case where the absorption axis of the polarizer and the in-plane slow axis of the second optically anisotropic layer are orthogonal to each other, the X and the Y satisfy Requirement 5-1 or 6-1, $$70° \leq X < 110° \text{ and } -X+120° \leq Y \leq -X+140° \quad \text{Requirement 5-1:}$$

$$70° < X \leq 110° \text{ and } -X+40° \leq Y \leq -X+60°. \quad \text{Requirement 6-1:}$$

4. The circularly polarizing plate according to claim 3,
wherein the second optically anisotropic layer is a stretched film or a layer formed by fixing a liquid crystal compound.

5. A display device comprising:
the circularly polarizing plate according to claim 3.

6. The circularly polarizing plate according to claim 1,
wherein the second optically anisotropic layer is a stretched film or a layer formed by fixing a liquid crystal compound.

7. A display device comprising:
the circularly polarizing plate according to claim 6.

* * * * *